US008963963B2

(12) United States Patent
Hildreth et al.

(10) Patent No.: US 8,963,963 B2
(45) Date of Patent: Feb. 24, 2015

(54) VIDEO-BASED IMAGE CONTROL SYSTEM

(71) Applicant: QUALCOMM Incorporated, San Diego, CA (US)

(72) Inventors: Evan Hildreth, Thornhill (CA); Francis MacDougall, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/098,382

(22) Filed: Dec. 5, 2013

(65) Prior Publication Data

US 2014/0092013 A1    Apr. 3, 2014

Related U.S. Application Data

(63) Continuation of application No. 13/593,355, filed on Aug. 23, 2012, now Pat. No. 8,624,932, which is a continuation of application No. 11/840,550, filed on Aug. 17, 2007, now Pat. No. 8,274,535, which is a continuation of application No. 11/757,180, filed on Jun. 1, 2007, now Pat. No. 7,898,522, which is a continuation of application No. 09/909,857, filed on Jul. 23, 2001, now Pat. No. 7,227,526.

(60) Provisional application No. 60/220,223, filed on Jul. 24, 2000.

(51) Int. Cl.
*G09G 5/00* (2006.01)
*G06F 3/01* (2006.01)
(Continued)

(52) U.S. Cl.
CPC ............. *G06F 3/011* (2013.01); *G06F 3/017* (2013.01); *G06K 9/00375* (2013.01); *G06T 7/0044* (2013.01); *G06T 7/0075* (2013.01); *H04N 13/0239* (2013.01); *G06T 19/006* (2013.01); *A63F 2300/1093* (2013.01); *A63F 2300/69* (2013.01); *A63F 2300/8082* (2013.01); *G06T 2207/10012* (2013.01); *G06T 2207/10021* (2013.01); *G06T 2207/20021* (2013.01); *G06T 2207/30196* (2013.01); *H04N 13/0246* (2013.01); *H04N 2013/0081* (2013.01)
USPC ........... 345/676; 345/156; 345/157; 382/126; 382/151; 382/291

(58) Field of Classification Search
USPC .......................................... 345/158; 382/103
See application file for complete search history.

(56) References Cited

U.S. PATENT DOCUMENTS

| 4,146,924 | A | 3/1979 | Birk et al. |
| 5,351,044 | A | 9/1994 | Mathur et al. |

(Continued)

FOREIGN PATENT DOCUMENTS

| EP | 0905644 A2 | 3/1999 |
| JP | 2000056916 A | 2/2000 |

(Continued)

OTHER PUBLICATIONS

European Patent Office Communication, European Application No. 01959142.0, dated Jul. 11, 2006, 4 pages.

(Continued)

*Primary Examiner* — Phi Hoang
(74) *Attorney, Agent, or Firm* — Kilpatrick Townsend & Stockton LLP

(57) ABSTRACT

A method of using stereo vision to interface with a computer is provided. The method includes capturing a stereo image, and processing the stereo image to determine position information of an object in the stereo image. The object is controlled by a user. The method also includes communicating the position information to the computer to allow the user to interact with a computer application.

30 Claims, 16 Drawing Sheets

(51) Int. Cl.
  *G06K 9/00* (2006.01)
  *G06T 7/00* (2006.01)
  *H04N 13/02* (2006.01)
  *G06T 19/00* (2011.01)
  *H04N 13/00* (2006.01)

(56) References Cited

U.S. PATENT DOCUMENTS

| | | |
|---|---|---|
| 5,446,548 A | 8/1995 | Gerig et al. |
| 5,475,422 A | 12/1995 | Mori et al. |
| 5,531,044 A | 7/1996 | Wallenius |
| 5,534,917 A | 7/1996 | MacDougall |
| 5,559,695 A | 9/1996 | Daily |
| 5,594,469 A | 1/1997 | Freeman et al. |
| 5,652,616 A | 7/1997 | Chen et al. |
| 5,714,997 A | 2/1998 | Anderson |
| 5,745,126 A | 4/1998 | Jain et al. |
| 5,748,199 A | 5/1998 | Palm |
| 5,760,823 A | 6/1998 | Brunson et al. |
| 5,769,640 A | 6/1998 | Jacobus et al. |
| 5,844,392 A | 12/1998 | Peurach et al. |
| 5,907,328 A | 5/1999 | Brush II et al. |
| 5,917,937 A | 6/1999 | Szeliski et al. |
| 5,986,675 A | 11/1999 | Anderson et al. |
| 6,002,808 A | 12/1999 | Freeman |
| 6,072,494 A | 6/2000 | Nguyen |
| 6,075,895 A | 6/2000 | Qiao et al. |
| 6,088,035 A | 7/2000 | Sudarsky et al. |
| 6,125,198 A | 9/2000 | Onda |
| 6,173,066 B1 | 1/2001 | Peurach et al. |
| 6,191,773 B1* | 2/2001 | Maruno et al. ............ 345/158 |
| 6,191,796 B1* | 2/2001 | Tarr ............................ 345/581 |
| 6,198,485 B1 | 3/2001 | Mack et al. |
| 6,215,890 B1* | 4/2001 | Matsuo et al. ............. 382/103 |
| 6,215,898 B1 | 4/2001 | Woodfill et al. |
| 6,222,465 B1* | 4/2001 | Kumar et al. .............. 341/20 |
| 6,249,600 B1 | 6/2001 | Reed et al. |
| 6,256,400 B1* | 7/2001 | Takata et al. .............. 382/103 |
| 6,272,231 B1 | 8/2001 | Maurer et al. |
| 6,396,509 B1* | 5/2002 | Cheng ........................ 715/706 |
| 6,456,728 B1* | 9/2002 | Doi et al. ................... 382/103 |
| 6,456,737 B1 | 9/2002 | Woodfill et al. |
| 6,611,242 B1 | 8/2003 | Hongo et al. |
| 6,624,833 B1* | 9/2003 | Kumar et al. .............. 715/863 |
| 6,661,918 B1 | 12/2003 | Gordon et al. |
| 6,693,666 B1 | 2/2004 | Baker et al. |
| 6,792,358 B2* | 9/2004 | Rojas et al. ................ 702/33 |
| 6,842,175 B1* | 1/2005 | Schmalstieg et al. ...... 345/427 |
| 6,976,216 B1 | 12/2005 | Peskin et al. |
| 7,058,204 B2 | 6/2006 | Hildreth et al. |
| 7,227,526 B2 | 6/2007 | Hildreth et al. |
| 7,339,580 B2 | 3/2008 | Westerman et al. |
| 7,619,618 B2 | 11/2009 | Westerman et al. |
| 7,898,522 B2 | 3/2011 | Hildreth et al. |
| 8,274,535 B2 | 9/2012 | Hildreth et al. |
| 2001/0003712 A1* | 6/2001 | Roelofs ...................... 463/37 |
| 2001/0017651 A1 | 8/2001 | Baker et al. |
| 2001/0033675 A1 | 10/2001 | Maurer et al. |
| 2002/0135581 A1* | 9/2002 | Russell et al. ............. 345/474 |
| 2002/0181773 A1* | 12/2002 | Higaki et al. .............. 382/190 |
| 2003/0138130 A1 | 7/2003 | Cohen et al. |
| 2004/0046736 A1 | 3/2004 | Pryor et al. |
| 2004/0104935 A1 | 6/2004 | Williamson et al. |
| 2004/0135886 A1 | 7/2004 | Baker et al. |
| 2005/0100207 A1 | 5/2005 | Konolige |
| 2005/0131660 A1 | 6/2005 | Yadegar et al. |
| 2006/0013473 A1 | 1/2006 | Woodfill et al. |
| 2006/0098873 A1 | 5/2006 | Hildreth et al. |
| 2006/0238519 A1 | 10/2006 | Westerman et al. |
| 2008/0018595 A1 | 1/2008 | Hildreth et al. |
| 2013/0147790 A1 | 6/2013 | Hildreth et al. |

FOREIGN PATENT DOCUMENTS

| | | |
|---|---|---|
| WO | WO-9934276 A2 | 7/1999 |
| WO | WO-9935633 A2 | 7/1999 |
| WO | WO-0030023 A1 | 5/2000 |

OTHER PUBLICATIONS

Extended European Search Report for Application No. 08010963.0 dated Oct. 16, 2008, 7 pages.
Fukumoto, et al., "Finger-Pointer: Pointing Interface by Image Processing," Oct. 22, 1997, 16 pages.
Huber E., "3-D real-time gesture recognition using proximity spaces", Proceedings of the IEEE Workshop on Applications of Computervision, XX, XX, Dec. 1, 1996, pp. 136-141, XP002135707.
International Search Report—PCT/US2001/023224—ISA/EPO—Jan. 8, 2003.
Jennings, C. "Robust Finger Tracking with Multiple Cameras", Proceedings, International Workshop on Recognition, Analysis, and Tracking of Faces and Gestures in Real-Time Systems, Jul. 20, 1999, (http://www.cs.ubc.ca/spider/jennings/ratfg-rts99/cj99.html), 16 pages.
Kato, et al., "Virtual Object Manipulation on a Table-Top AR Environment", Augmented Reality, 2000. (ISAR 2000). Proceedings IEEE and ACM International Symposium on., vol. No. pp. 11-19, 2000 doi: 10.1109/ISAR.2000.880934 URL: http://ieeexplore.ieee.org/stamp/stamp.jsp"tp=&arnumber=88093.
Morrison, et al,. "Machine Vision Passive Touch Technology for Interactive Displays,"SID 01 Digest, Jun. 2001, pp. 74-77.
Non-Final Office Action issued in U.S. Appl. No. 11/840,550, mailed Jul. 26, 2010, 17 pages.
Office Action for U.S. Appl. No. 09/909,857 mailed May 4, 2005, 48 pages.
Office Action for U.S. Appl. No. 09/909,857, mailed Jul. 10, 2006, 13 pages.
Office Action for U.S. Appl. No. 09/909,857, mailed Aug. 23, 2004, 41 pages.
Office Action for U.S. Appl. No. 09/909,857, mailed Nov. 28, 2005, 44 pages.
Okutomi, et al., "A Multiple-baseline Stereo," IEEE Transactions of Pattern Analysis and machine Intelligence, vol. 14, No. 4, Apr. 1993, pp. 355-363.
Pavlovic, et al., "Visual Interpretation of Hand Gestures for Human-Computer Interaction: A Review," IEEE Transactions on Pattern Analysis and Machine Intelligence, vol. 19, no. 7, Jul. 1997, pp. 19.
Point Grey Research Inc. Digiclops—http://www.ptgrey.com/, 2 pages, Apr. 21, 2006.
Remagnino, et al., "Correlation Techniques in adaptive template matching with uncalibrated cameras", Lafia-Inria Rhoned-Alpes, France, 1994, 12 pages.
Scharstein D. et al., "Stereo Matching with Non-Linear Diffusion", International Journal of Computer Vision 28 (2), 1998, pp. 155-174.
Small Vision Systems Stereo Developer Kit, http://www.videredesign.com., Oct. 19, 2011, 4 pages.
Non-Final Office Action for U.S. Appl. No. 11/757,180, mailed Jan. 29, 2010, 24 pages.
Urmson, "A Comparison of Pt. Grey Research's Digiclops and Videre Design's Small Vision System for Sensing on the Hypeion Robot," (http://www.videredesign.com), Nov. 2000, 18 pages.
Watanabe, et al., "Real-Time Gesture Recognition Using Maskable Template Model," IEEE Proceedings of Multimedia '96, pp. 341-348, Jun. 1996.
Zhang, "A Flexible New Technique for Camera Calibration", Dec. 2, 1998, 22 pages.
Zhang, "Determining the Epipolar Geometry and its Uncertainty", International Journal of Computer Vision, vol. 27, No. 2, pp. 161-198, 1998.

* cited by examiner

VIDEO-BASED IMAGE CONTROL SYSTEM

CROSS-REFERENCE TO RELATED APPLICATIONS

This application is a continuation of prior U.S. patent application Ser. No. 13/593,355, filed Aug. 23, 2012, which is a continuation of prior U.S. patent application Ser. No. 11/840,550, filed Aug. 17, 2007, which issued as U.S. Pat. No. 8,274,535 on Sep. 25, 2012, which is a continuation of prior U.S. patent application Ser. No. 11/757,180, filed on Jun. 1, 2007, which issued as U.S. Pat. No. 7,898,522 on Mar. 1, 2011, which is a continuation of prior U.S. patent application Ser. No. 09/909,857, filed Jul. 23, 2001, which issued as U.S. Pat. No. 7,227,526 on Jun. 5, 2007, which claims the benefit of U.S. Provisional Patent Application No. 60/220,223, filed Jul. 24, 2000, and all of the foregoing applications are incorporated by reference herein in their entirety for all purposes.

TECHNICAL FIELD

This invention relates to an image processing system, and more particularly to a video based image control system for processing stereo image data.

BACKGROUND

A variety of operating systems are currently available for interacting with and controlling a computer system. Many of these operating systems use standardized interfaces based on commonly accepted graphical user interface (GUI) functions and control techniques. As a result, different computer platforms and user applications can be easily controlled by a user who is relatively unfamiliar with the platform and/or application, as the functions and control techniques are generally common from one GUI to another.

One commonly accepted control technique is the use of a mouse or trackball style pointing device to move a cursor over screen objects. An action, such as clicking (single or double) on the object, executes a GUI function. However, for someone who is unfamiliar with operating a computer mouse, selecting GUI functions may present a challenge that prevents them from interfacing with the computer system. There also exist situations where it becomes impractical to provide access to a computer mouse or trackball, such as in front of a department store display window on a city street, or where the user is physically challenged.

SUMMARY

In one general aspect, a method of using stereo vision to interface with a computer is disclosed. The method includes capturing a stereo image and processing the stereo image to determine position information of an object in the stereo image. The object may be controlled by a user. The method further includes using the position information to allow the user to interact with a computer application.

The step of capturing the stereo image may include capturing the stereo image using a stereo camera. The method also may include recognizing a gesture associated with the object by analyzing changes in the position information of the object, and controlling the computer application based on the recognized gesture. The method also may include determining an application state of the computer application, and using the application state in recognizing the gesture. The object may be the user. In another instance, the object is a part of the user.

The method may include providing feedback to the user relative to the computer application.

In the above implementation, processing the stereo image to determine position information of the object may include mapping the position information from position coordinates associated with the object to screen coordinates associated with the computer application. Processing the stereo image also may include processing the stereo image to identify feature information and produce a scene description from the feature information.

Processing the stereo image also may include analyzing the scene description to identify a change in position of the object and mapping the change in position of the object. Processing the stereo image to produce the scene description also may include processing the stereo image to identify matching pairs of features in the stereo image, and calculating a disparity and a position for each matching feature pair to create a scene description.

The method may include analyzing the scene description in a scene analysis process to determine position information of the object.

Capturing the stereo image may include capturing a reference image from a reference camera and a comparison image from a comparison camera, and processing the stereo image also may include processing the reference image and the comparison image to create pairs of features.

Processing the stereo image to identify matching pairs of features in the stereo image also may include identifying features in the reference image, generating for each feature in the reference image a set of candidate matching features in the comparison image, and producing a feature pair by selecting a best matching feature from the set of candidate matching features for each feature in the reference image. Processing the stereo image also may include filtering the reference image and the comparison image.

Producing the feature pair may include calculating a match score and rank for each of the candidate matching features, and selecting the candidate matching feature with the highest match score to produce the feature pair.

Generating for each feature in the reference image, a set of candidate matching features may include selecting candidate matching features from a predefined range in the comparison image.

Feature pairs may be eliminated based upon the match score of the candidate matching feature. Feature pairs also may be eliminated if the match score of the top ranking candidate matching feature is below a predefined threshold. The feature pair may be eliminated if the match score of the top ranking candidate matching feature is within a predefined threshold of the match score of a lower ranking candidate matching feature.

Calculating the match score may include identifying those feature pairs that are neighboring, adjusting the match score of feature pairs in proportion to the match score of neighboring candidate matching features at similar disparity, and selecting the candidate matching feature with the highest adjusted match score to create the feature pair.

Feature pairs may be eliminated by applying the comparison image as the reference image and the reference image as the comparison image to produce a second set of feature pairs, and eliminating those feature pairs in the original set of feature pairs which do not have a corresponding feature pair in the second set of feature pairs.

The method may include for each feature pair in the scene description, calculating real world coordinates by transforming the disparity and position of each feature pair relative to the real world coordinates of the stereo image. Selecting features may include dividing the reference image and the comparison image of the stereo image into blocks. The feature may be described by a pattern of luminance of the pixels contained with the blocks. Dividing also may include dividing the images into pixel blocks having a fixed size. The pixel blocks may be 8×8 pixel blocks.

Analyzing the scene description to determine the position information of the object also may include cropping the scene description to exclude feature information lying outside of a region of interest in a field of view. Cropping may include establishing a boundary of the region of interest.

Analyzing the scene description to determine the position information of the object also may include clustering the feature information in a region of interest into clusters having a collection of features by comparison to neighboring feature information within a predefined range, and calculating a position for each of the clusters. Analyzing the scene description also may include eliminating those clusters having less than a predefined threshold of features.

Analyzing the scene description also may include selecting the position of the clusters that match a predefined criteria, recording the position of the clusters that match the predefined criteria as object position coordinates, and outputting the object position coordinates. The method also may include determining the presence of a user from the clusters by checking features within a presence detection region. Calculating the position for each of the clusters may exclude those features in the clusters that are outside of an object detection region.

The method may include defining a dynamic object detection region based on the object position coordinates. Additionally, the dynamic object detection region may be defined relative to a user's body.

The method may include defining a body position detection region based on the object position coordinates. Defining the body position detection region also may include detecting a head position of the user. The method also many include smoothing the motion of the object position coordinates to eliminate jitter between consecutive image frames.

The method may include calculating hand orientation information from the object position coordinates. Outputting the object position coordinates may include outputting the hand orientation information. Calculating hand orientation information also may include smoothing the changes in the hand orientation information.

Defining the dynamic object detection region also may include identifying a position of a torso-divisioning plane from the collection of features, and determining the position of a hand detection region relative to the torso-divisioning plane in the axis perpendicular to the torso divisioning plane.

Defining the dynamic object detection region may include identifying a body center position and a body boundary position from the collection of features, identifying a position indicating part of an arm of the user from the collection of features using the intersection of the feature pair cluster with the torso divisioning plane, and identifying the arm as either a left arm or a right arm using the arm position relative to the body position.

This method also may include establishing a shoulder position from the body center position, the body boundary position, the torso-divisioning plane, and the left arm or the right arm identification. Defining the dynamic object detection region may include determining position data for the hand detection region relative to the shoulder position.

This technique may include smoothing the position data for the hand detection region. Additionally, this technique may include determining the position of the dynamic object detection region relative to the torso divisioning plane in the axis perpendicular to the torso divisioning plane, determining the position of the dynamic object detection region in the horizontal axis relative to the shoulder position, and determining the position of the dynamic object detection region in the vertical axis relative to an overall height of the user using the body boundary position.

Defining the dynamic object detection region may include establishing the position of a top of the user's head using topmost feature pairs of the collection of features unless the topmost feature pairs are at the boundary, and determining the position of a hand detection region relative to the top of the user's head.

In another aspect, a method of using stereo vision to interface with a computer is disclosed. The method includes capturing a stereo image using a stereo camera, and processing the stereo image to determine position information of an object in the stereo image, wherein the object is controlled by a user. The method further includes processing the stereo image to identify feature information, to produce a scene description from the feature information, and to identify matching pairs of features in the stereo image. The method also includes calculating a disparity and a position for each matching feature pair to create the scene description, and analyzing the scene description in a scene analysis process to determine position information of the object. The method may include clustering the feature information in a region of interest into clusters having a collection of features by comparison to neighboring feature information within a predefined range, calculating a position for each of the clusters, and using the position information allow the user to interact with a computer application.

Additionally, this technique may include mapping the position of the object from the feature information from camera coordinates to screen coordinates associated with the computer application, and using the mapped position to interface with the computer application.

The method may include recognizing a gesture associated with the object by analyzing changes in the position information of the object in the scene description, and combining the position information and the gesture to interface with the computer application. The step of capturing the stereo image may include capturing the stereo image using a stereo camera.

In another aspect, a stereo vision system for interfacing with an application program running on a computer is disclosed. The stereo vision system includes first and second video cameras arranged in an adjacent configuration and operable to produce a series of stereo video images. A processor is operable to receive the series of stereo video images and detect objects appearing in an intersecting field of view of the cameras. The processor executes a process to define an object detection region in three-dimensional coordinates relative to a position of the first and second video cameras, select a control object appearing within the object detection region, and map position coordinates of the control object to a position indicator associated with the application program as the control object moves within the object detection region.

The process may select as a control object a detected object appearing closest to the video cameras and within the object detection region. The control object may be a human hand.

A horizontal position of the control object relative to the video cameras may be mapped to a x-axis screen coordinate of the position indicator. A vertical position of the control object relative to the video cameras may be mapped to a y-axis screen coordinate of the position indicator.

The processor may be configured to map a horizontal position of the control object relative to the video cameras to a x-axis screen coordinate of the position indicator, map a vertical position of the control object relative to the video cameras to a y-axis screen coordinate of the position indicator, and emulate a mouse function using the combined x-axis and y-axis screen coordinates provided to the application program.

The processor may be configured to emulate buttons of a mouse using gestures derived from the motion of the object position. The processor may be configured to emulate buttons of a mouse based upon a sustained position of the control object in any position within the object detection region for a predetermined time period. In other instances, the processor may be configured to emulate buttons of a mouse based upon a position of the position indicator being sustained within the bounds of an interactive display region for a predetermined time period. The processor may be configured to map a z-axis depth position of the control object relative to the video cameras to a virtual z-axis screen coordinate of the position indicator.

The processor may be configured to map a x-axis position of the control object relative to the video cameras to a x-axis screen coordinate of the position indicator, map a y-axis position of the control object relative to the video cameras to a y-axis screen coordinate of the position indicator, and map a z-axis depth position of the control object relative to the video cameras to a virtual z-axis screen coordinate of the position indicator.

A position of the position indicator being within the bounds of an interactive display region may trigger an action within the application program. Movement of the control object along a z-axis depth position that covers a predetermined distance within a predetermined time period may trigger a selection action within the application program.

A position of the control object being sustained in any position within the object detection region for a predetermined time period may trigger part of a selection action within the application program.

In another aspect, a stereo vision system for interfacing with an application program running on a computer is disclosed. The stereo vision system includes first and second video cameras arranged in an adjacent configuration and operable to produce a series of stereo video images. A processor is operable to receive the series of stereo video images and detect objects appearing in the intersecting field of view of the cameras. The processor executes a process to define an object detection region in three-dimensional coordinates relative to a position of the first and second video cameras, select as a control object a detected object appearing closest to the video cameras and within the object detection region, define sub regions within the object detection region, identify a sub region occupied by the control object, associate with that sub region an action that is activated when the control object occupies that sub region, and apply the action to interface with a computer application.

The action associated with the sub region is further defined to be an emulation of the activation of keys associated with a computer keyboard. A position of the control object being sustained in any sub region for a predetermined time period may trigger the action.

In yet another aspect, a stereo vision system for interfacing with an application program running on a computer is disclosed. First and second video cameras are arranged in an adjacent configuration and are operable to produce a series of stereo video images. A processor is operable to receive the series of stereo video images and detect objects appearing in an intersecting field of view of the cameras. The processor executes a process to identify an object perceived as the largest object appearing in the intersecting field of view of the cameras and positioned at a predetermined depth range, select the object as an object of interest, determine a position coordinate representing a position of the object of interest, and use the position coordinate as an object control point to control the application program.

The process also may cause the processor to determine and store a neutral control point position, map a coordinate of the object control point relative to the neutral control point position, and use the mapped object control point coordinate to control the application program.

The process may cause the processor to define a region having a position based upon the position of the neutral control point position, map the object control point relative to its position within the region, and use the mapped object control point coordinate to control the application program. The process also may cause the processor to transform the mapped object control point to a velocity function, determine a viewpoint associated with a virtual environment of the application program, and use the velocity function to move the viewpoint within the virtual environment.

The process may cause the processor to map a coordinate of the object control point to control a position of an indicator within the application program. In this implementation the indicator may be an avatar.

The process may cause the processor to map a coordinate of the object control point to control an appearance of an indicator within the application program. In this implementation the indicator may be an avatar. The object of interest may be a human appearing within the intersecting field of view.

In another aspect, a stereo vision system for interfacing with an application program running on a computer is disclosed. The stereo vision system includes first and second video cameras arranged in an adjacent configuration and operable to produce a series of stereo video images. A processor is operable to receive the series of stereo video images and detect objects appearing in an intersecting field of view of the cameras. The processor executes a process to identify an object perceived as the largest object appearing in the intersecting field of view of the cameras and positioned at a predetermined depth range, select the object as an object of interest, define a control region between the cameras and the object of interest, the control region being positioned at a predetermined location and having a predetermined size relative to a size and a location of the object of interest, search the control region for a point associated with the object of interest that is closest to the cameras and within the control region, select the point associated with the object of interest as a control point if the point associated with the object of interest is within the control region, and map position coordinates of the control point, as the control point moves within the control region, to a position indicator associated with the application program.

The processor may be operable to map a horizontal position of the control point relative to the video cameras to a x-axis screen coordinate of the position indicator, map a vertical position of the control point relative to the video cameras to a y-axis screen coordinate of the position indicator, and emulate a mouse function using a combination of the x-axis and the y-axis screen coordinates.

Alternatively, the processor also may be operable to map a x-axis position of the control point relative to the video cameras to a x-axis screen coordinate of the position indicator, map a y-axis position of the control point relative to the video cameras to a y-axis screen coordinate of the position indicator, and map a z-axis depth position of the control point relative to the video cameras to a virtual z-axis screen coordinate of the position indicator.

In the stereo vision system, the object of interest may be a human appearing within the intersecting field of view. Additionally, the control point may be associated with a human hand appearing within the control region.

In yet another aspect, a stereo vision system for interfacing with an application program running on a computer is disclosed. First and second video cameras are arranged in an adjacent configuration and are operable to produce a series of stereo video images. A processor is operable to receive the series of stereo video images and detect objects appearing in an intersecting field of view of the cameras. The processor executes a process to define an object detection region in three-dimensional coordinates relative to a position of the first and second video cameras, select up to two hand objects from the objects appearing in the intersecting field of view that are within the object detection region, and map position coordinates of the hand objects, as the hand objects move within the object detection region, to positions of virtual hands associated with an avatar rendered by the application program.

The process may select the up to two hand objects from the objects appearing in the intersecting field of view that are closest to the video cameras and within the object detection region. The avatar may take the form of a human-like body. Additionally, the avatar may be rendered in and interact with a virtual environment forming part of the application program. The processor may execute a process to compare the positions of the virtual hands associated with the avatar to positions of virtual objects within the virtual environment to enable a user to interact with the virtual objects within the virtual environment.

The processor also may execute a process to detect position coordinates of a user within the intersecting field of view, and map the position coordinates of the user to a virtual torso of the avatar rendered by the application program. The process may move at least one of the virtual hands associated with the avatar to a neutral position if a corresponding hand object is not selected.

The processor also may execute a process to detect position coordinates of a user within the intersecting field of view, and map the position coordinates of the user to a velocity function that is applied to the avatar to enable the avatar to roam through a virtual environment rendered by the application program. The velocity function may include a neutral position denoting zero velocity of the avatar. The processor also may execute a process to map the position coordinates of the user relative to the neutral position into torso coordinates associated with the avatar so that the avatar appears to lean.

The processor also may execute a process to compare the position of the virtual hands associated with the avatar to positions of virtual objects within the virtual environment to enable the user to interact with the virtual objects while roaming through the virtual environment.

As part of the stereo vision system, a virtual knee position associated with the avatar may be derived by the application program and used to refine an appearance of the avatar. Additionally, a virtual elbow position associated with the avatar may be derived by the application program and used to refine an appearance of the avatar.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
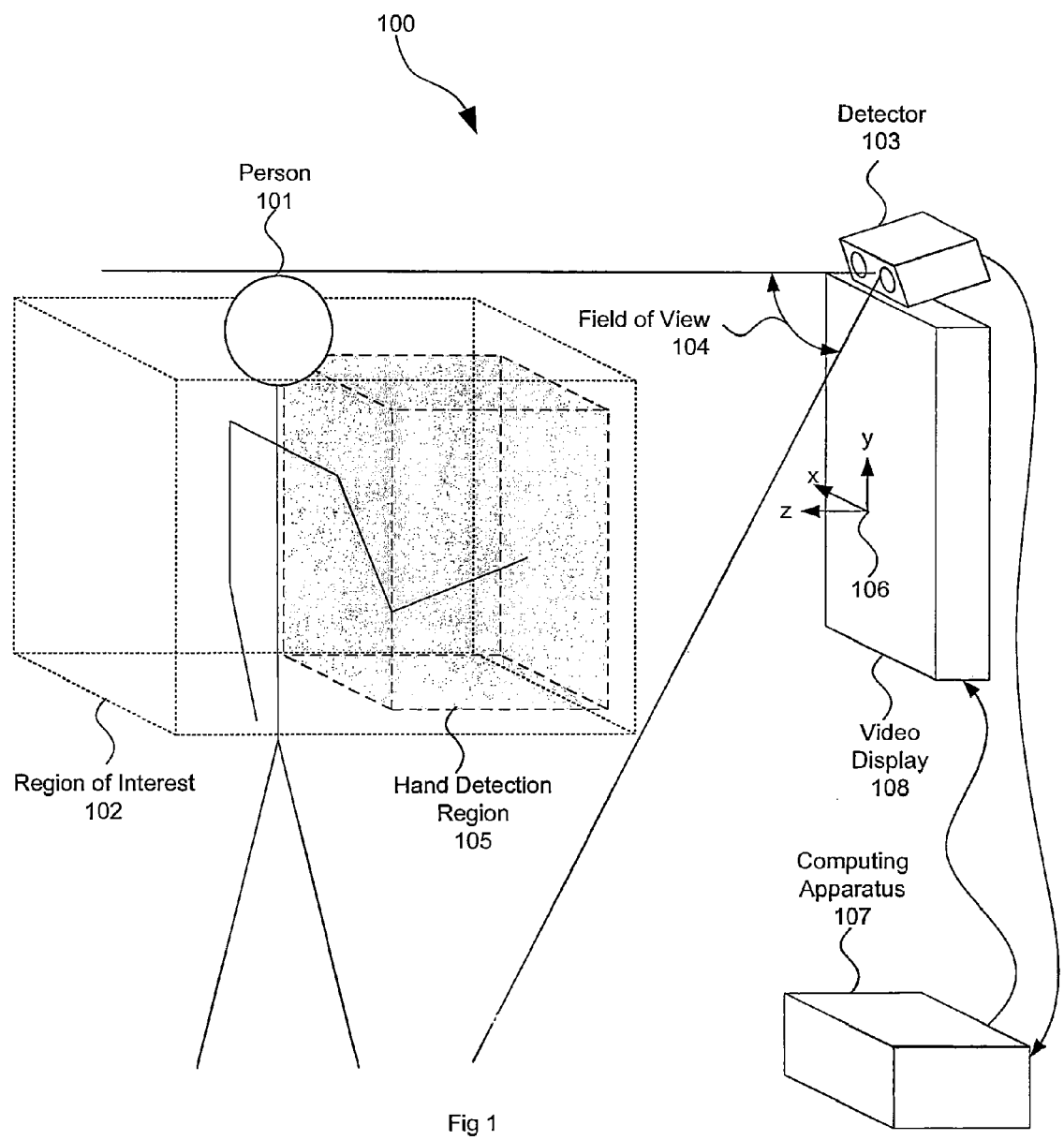
FIG. 1 shows the hardware components and environment of a typical implementation of a video-based image control system.

FIG. 1 shows one implementation of a video-based image control system 100. A person (or multiple people) 101 locates him or herself in, or reaching with his hand or hands into, a region of interest 102. The region of interest 102 is positioned relative to an image detector 103 so as to be in the overall field of view 104 of the image detector. The region of interest 102 contains a hand detection region 105 within which parts of the person's body, if present and detectable, are located and their positions and motions measured. The regions, positions and measures are expressed in a three-dimensional x, y, z coordinate or world-coordinate system 106 which does not need to be aligned to the image detector 103. A series of video images generated by the image detector 103 are processed by a computing apparatus 107, such as a personal computer, capable of displaying a video image on a video display 108.

As will be described in greater detail below, the computing apparatus 107 processes the series of video images in order to analyze the position and gestures of an object such as the user's hand. The resulting position and gesture information then is mapped into an application program, such as a graphical user interface (GUI) or a video game. A representation of the position and gestures of the user's hand (such as a screen pointer or cursor) is presented on the video display 108 and allows functions within the GUI or video game to be executed and/or controlled. An exemplary function is moving the cursor over a screen button and receiving a "click" or "press" gesture to select the screen button. The function associated with the button may then be executed by the computing apparatus 107. The image detector 103 is described in greater detail below. System 100 may be implemented in a variety of configurations including a desktop configuration where the image detector 103 is mounted on a top surface of the video display 108 for viewing the region of interest 102, or alternatively an overhead camera configuration where the image detector 103 is mounted on a support structure and positioned above the video display 108 for viewing the region of interest 102.

Figure 2:
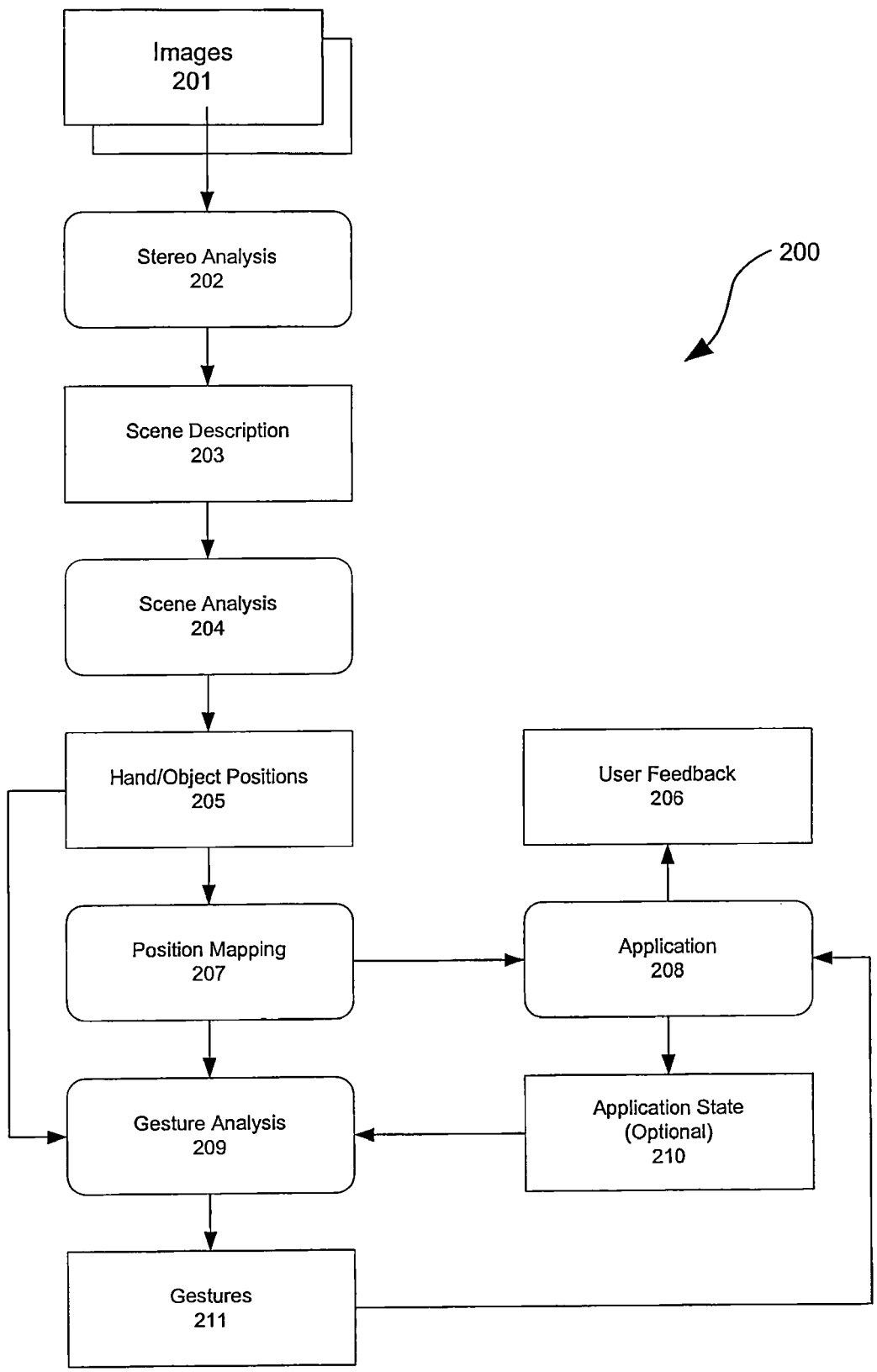
FIG. 2 is a flow diagram generally describing the processing technique employed by the system of FIG. 1.

FIG. 2 shows the video image analysis process 200, that may be implemented through computer software or alternatively computer hardware, involved in a typical implementation of the system 100. The image detector or video camera 103 acquires stereo images 201 of the region of interest 102 and the surrounding scene. These stereo images 201 are conveyed to the computing apparatus 107 (which may optionally be incorporated into the image detector 103), which performs a stereo analysis process 202 on the stereo images 201 to produce a scene description 203. From the scene description 203, computing apparatus 107 or a different computing device, uses a scene analysis process 204 to calculate and output hand/object position information 205 of the person's (or people's) hand(s) or other suitable pointing device and optionally the positions or measures of other features of the person's body. The hand/object position information 205 is a set of three-dimensional coordinates that are provided to a position mapping process 207 that maps or transforms the three-dimensional coordinates to a scaled set of screen coordinates. These screen coordinates produced by the position mapping process 207 can then be used as screen coordinate position information by an application program 208 that runs on the computing apparatus 107 and provides user feedback 206.

Certain motions made by the hand(s), which are detected as changes in the position of the hand(s) and/or other features represented as the hand/object position information 205, may also be detected and interpreted, by a gesture analysis and detection process 209 as gesture information or gestures 211. The screen coordinate position information from the position mapping process 207 along with the gesture information 211 is then communicated to, and used to control, the application program 208.

The detection of gestures may be context sensitive, in which case an application state 210 may be used by the gesture detection process 209, and the criteria and meaning of gestures may be selected by the application program 208. An example of an application state 210 is a condition where the appearance of the cursor changes depending upon its displayed location on the video screen 108. Thus, if the user moves the cursor from one screen object to a different screen object, the icon representing the cursor may for example change from a pointer icon to a hand icon. Typically, the user receives feedback 206 as changes in the image presented on the video display 108. In general, the feedback 206 is provided by the application program 208 and pertains to the hand position and the state of the application on the video display 108.

The image detector 103 and the computing device 107 produce scene description information 203 that includes a three-dimensional position, or information from which the three-dimensional position is implied, for all or some subset of the objects or parts of the objects that make up the scene. Objects detected by the stereo cameras within the image detector 103 may be excluded from consideration if their positions lie outside the region of interest 102, or if they have shape or other qualities inconsistent with those expected of a person in a pose consistent with the typical use of the system 100. As a result, few limitations are imposed on the environment in which the system may operate. The environment may even contain additional people who are not interacting with the system. This is a unique aspect of the system 100 relative to other tracking systems that require that the parts of the image(s) that do not make up the user, that is the background, be static and/or modeled.

Also, few limitations are imposed on the appearance of the user and hand, as it is the general three-dimensional shape of the person and arm that is used to identify the hand. The user 101 may even wear a glove or mitten while operating system 100. This is also a unique aspect of system 100, as compared to other tracking systems that make use of the appearance of the hand, most commonly skin color, to identify the hand. Thus, system 100 can be considered more robust than methods relying on the appearance of the user and hand, because the appearance of bodies and hands are highly variable among poses and different people. However, it should be noted that appearance may be used by some implementations of the stereo analysis process 202 that are compatible with the system 100.

Typically, the scene description information 203 is produced through the use of stereo cameras. In such a system, the image detector 103 consists of two or more individual cameras and is referred to as a stereo camera head. The cameras may be black and white video cameras or may alternatively be color video cameras. Each individual camera acquires an image of the scene from a unique viewpoint and produces a series of video images. Using the relative positions of parts of the scene of each camera image, the computing device 107 can infer the distance of the object from the image detector 103, as desired for the scene description 203.

An implementation of a stereo camera image detector 103 that has been used for this system is described in greater detail below. Other stereo camera systems and algorithms exist that produce a scene description suitable for this system, and it should be understood that it is not intended that this system be limited to using the particular stereo system described herein.

Figure 3:
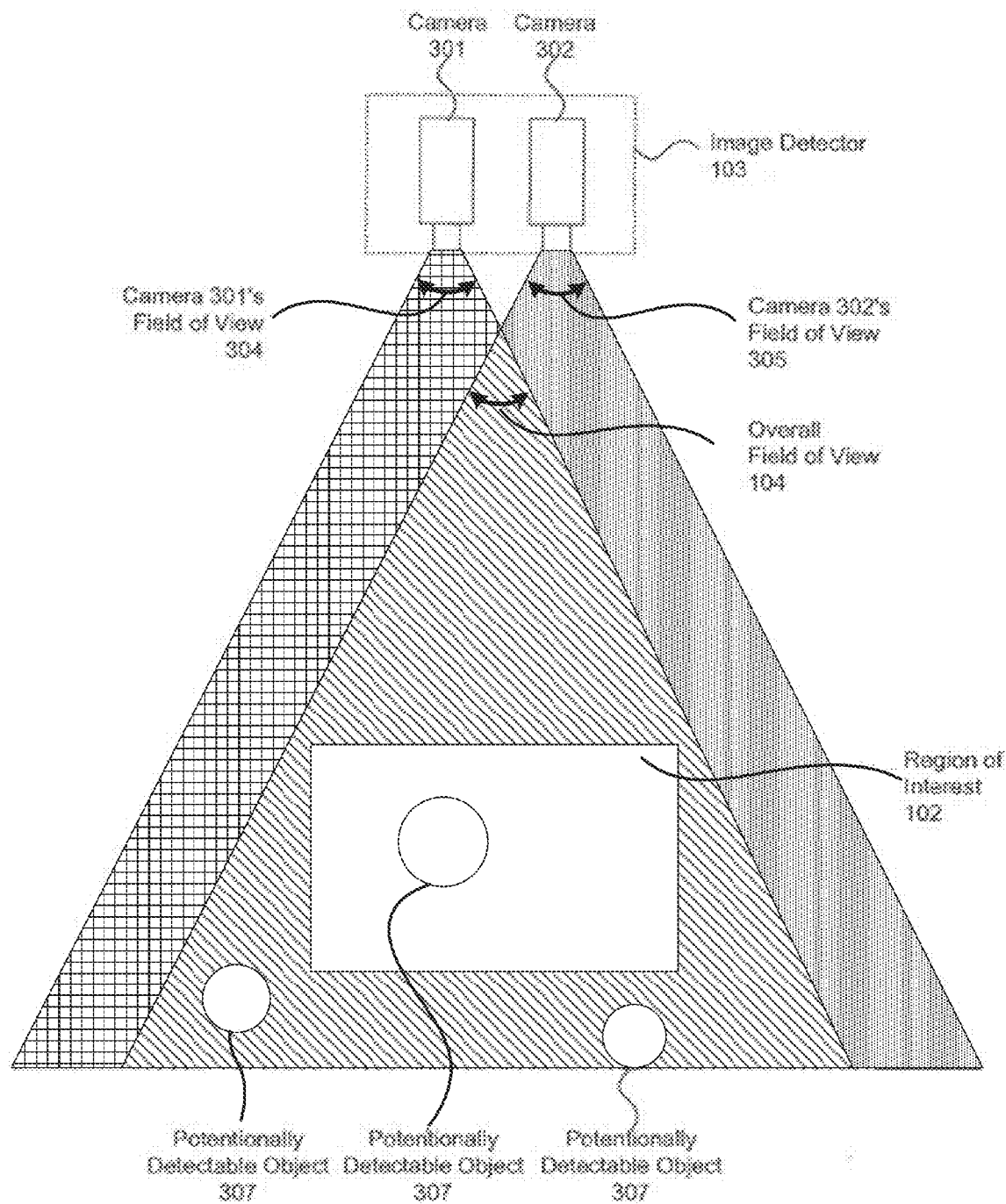
FIG. 3 is a diagram showing the field of view of each camera associated with the video-based image control system of FIG. 1.

Turning to FIG. 3 each camera 301, 302 of the image detector or stereo camera head 103 detects and produces an image of the scene that is within that camera's field of view 304, 305 (respectively). The overall field of view 104 is defined as the intersection of all the individual field of views 304, 305. Objects 307 within the overall field of view 104 have the potential to be detected, as a whole or in parts, by all the cameras 301, 302. The objects 307 may not necessarily lie within the region of interest 102. This is permissible because the scene description 203 is permitted to contain objects, or features of objects, that are outside the region of interest 102. With respect to FIG. 3, it should be noted that the hand detection region 105 is a subset of the region of interest 102.

Figure 4:
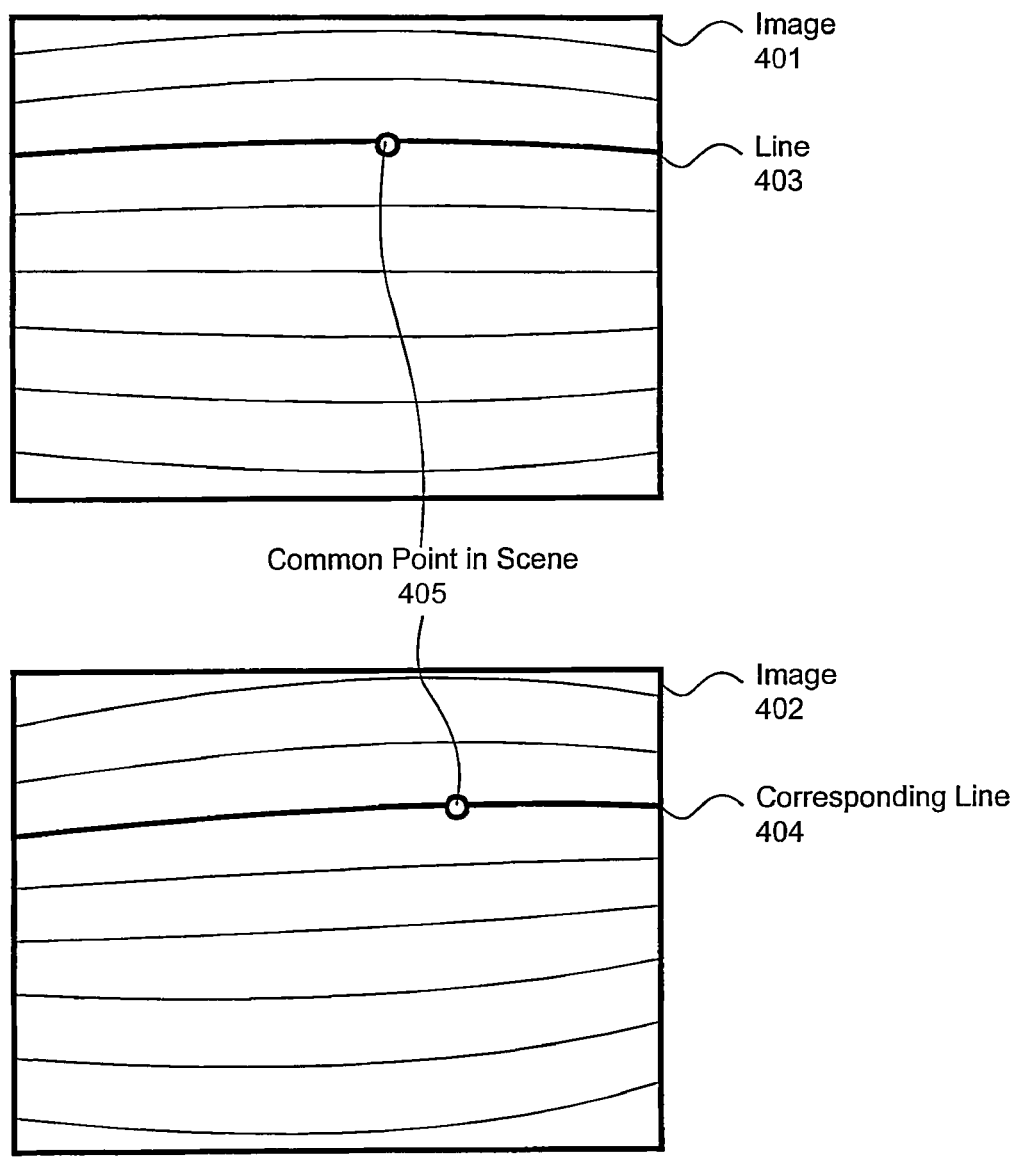
FIG. 4 shows a common point of interest and epipolar lines appearing in a pair of video images produced by a stereo camera device.

With respect to FIG. 4, each image 401 and 402 of the pair of images 201, is detected by the pair of cameras 103. There exists a set of lines in the image 401, such that for each line 403 of that set, there exists a corresponding line 404 in the other image 402. Further, any common point 405 in the scene that is located on the line 403, will also be located on the corresponding line 404 in the second camera image 402, so long as that point is within the overall field of view 104 and visible by both cameras 301, 302 (for example, not occluded by another object in the scene). These lines 403, 404 are referred to as epipolar lines. The difference in position of the point on each of the epipolar lines of the pair is referred to as disparity. Disparity is inversely proportional to distance, and therefore provides information required to produce the scene description 203.

The epipolar line pairs are dependent on the distortion in the cameras' images and the geometric relationship between the cameras 301, 302. These properties are determined and optionally analyzed through a pre-process referred to as calibration. The system must account for the radial distortion introduced by the lenses used on most cameras. One technique for resolving those camera characteristics that describe this radial distortion is presented in Z. Zhang, A Flexible New Technique for Camera Calibration, Microsoft Research, http://research.microsoft.com/~zhang, which is incorporated by reference, and may be used as the first step of calibration. This technique will not find the epipolar lines, but it causes the lines to be straight, which simplifies finding them. A subset of the methods described in Z. Zhang, Determining the Epipolar Geometry and its Uncertainty: A Review, *The international Journal of Computer Vision* 1997, and Z. Zhang, Determining the Epipolar Geometry and its Uncertainty: A review, Technical Report 2927, INRIA Sophia Antipolis, France, July 1996, both of which are incorporated by reference, may be applied to solve the epipolar lines, as the second step of calibration.

Figure 5:
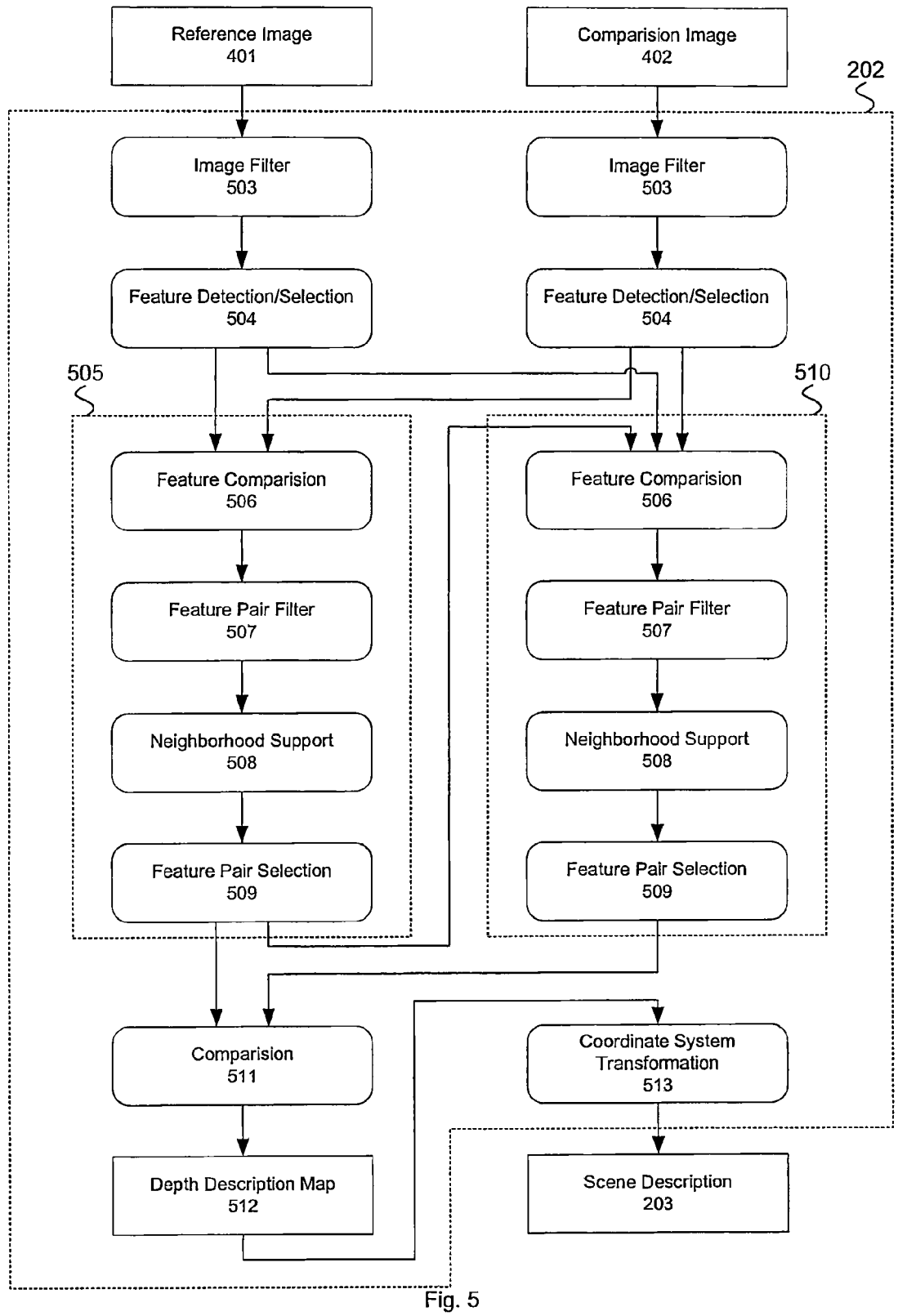
FIG. 5 is a flow diagram showing a stereo processing routine used to produce scene description information from stereo images.

One implementation of a stereo analysis process 202 that has been used to produce the scene description 203 is described in FIG. 5. The image pair 201 includes a reference image 401 and a comparison image 402. Individual images 401 and 402 are filtered by an image filter 503 and broken into features at block 504. Each feature is represented as an 8×8 block of pixels. However it should be understood that the features may be defined in pixel blocks that are larger or smaller than 8×8 and processed accordingly.

A matching process 505 seeks a match for each feature in the reference image. To this end, a feature comparison process 506 compares each feature in the reference image to all features that lie within a predefined range along the corresponding epipolar line, in the second or comparison image 402. In this particular implementation, a feature is defined as an 8×8 pixel block of the image 401 or 402, where the block is expected to contain a part of an object in the scene, represented as a pattern of pixel intensities (which, due to the filtering by the image filter 503, may not directly represent luminance) within the block. The likelihood that each pair of features matches is recorded and indexed by the disparity. Blocks within the reference image 401 are eliminated by a feature pair filter 507 if the best feature pair's likelihood of a match is weak (as compared to a predefined threshold), or if multiple feature pairs have similar likelihood of being the best match (where features are considered similar if the difference in their likelihood is within a predefined threshold). Of remaining reference features, the likelihood of all feature pairs is adjusted by a neighborhood support process 508 by an amount proportional to the likelihood found for neighboring reference features with feature pairs of similar disparity. For each reference feature, the feature pair with the best likelihood may now be selected by a feature pair selection process 509, providing a disparity (and hence, distance) for each reference feature.

Due to occlusion, a reference feature (produced by process 504) may not be represented in the second or comparison image 402 and the most likely matching feature that is present will be erroneous. Therefore, in a two camera system, the features selected in comparison image 402 are examined by a similar procedure (by applying processes 506, 507, 508, and 509 in a second parallel matching process 510) to determine the best matching features of those in reference image 401, a reversal of the previous roles for images 401 and 402. In a three camera system (i.e., a third camera is used in addition to cameras 301 and 302), the third camera's image replaces the comparison image 402, and the original reference image 401 continues to be used as the reference image, by a similar procedure (by applying processes 506, 507, 508, and 509 in the second parallel matching process 510) to determine the best matching features of those in the third image. If more than three cameras are available, this process can be repeated for each of the additional camera images. Any reference feature whose best matching paired feature has a more likely matching feature in the reference image 401 is eliminated in a comparison process 511. As a result, many erroneous matches, and therefore erroneous distances, caused by occlusion are eliminated.

The result of the above procedure is a depth description map 512 that describes the position and disparity of features relative to the images 401, 402. These positions and disparities (measured in pixels) are transformed by a coordinate system transformation process 513 to the arbitrary three-dimensional world coordinate system (x, y, z coordinate system) (106 of FIG. 1) by applying Eq. 1, Eq. 2 and Eq. 3, which are presented below. Disparity can be difficult to work with because it is non-linearly related to distance. For this reason, these equations generally are applied at this time so that the coordinates of the scene description 203 are described in terms of linear distance relative to the world coordinate system 106. Application of these equations, however, will redistribute the coordinates of the features in such a way that the density of features in a region will be affected, which makes the process of clustering features (performed in a later step) more difficult. Therefore, the original image-based coordinates typically are maintained along with the transformed coordinates.

This transformed depth description map produced by transformation process 513 is the scene description 203 (of FIG. 2). It is the task of the scene analysis process 204 to make sense of this information and extract useful data. Typically, the scene analysis process 204 is dependent on the particular scenario in which this system is applied.

Figure 6:
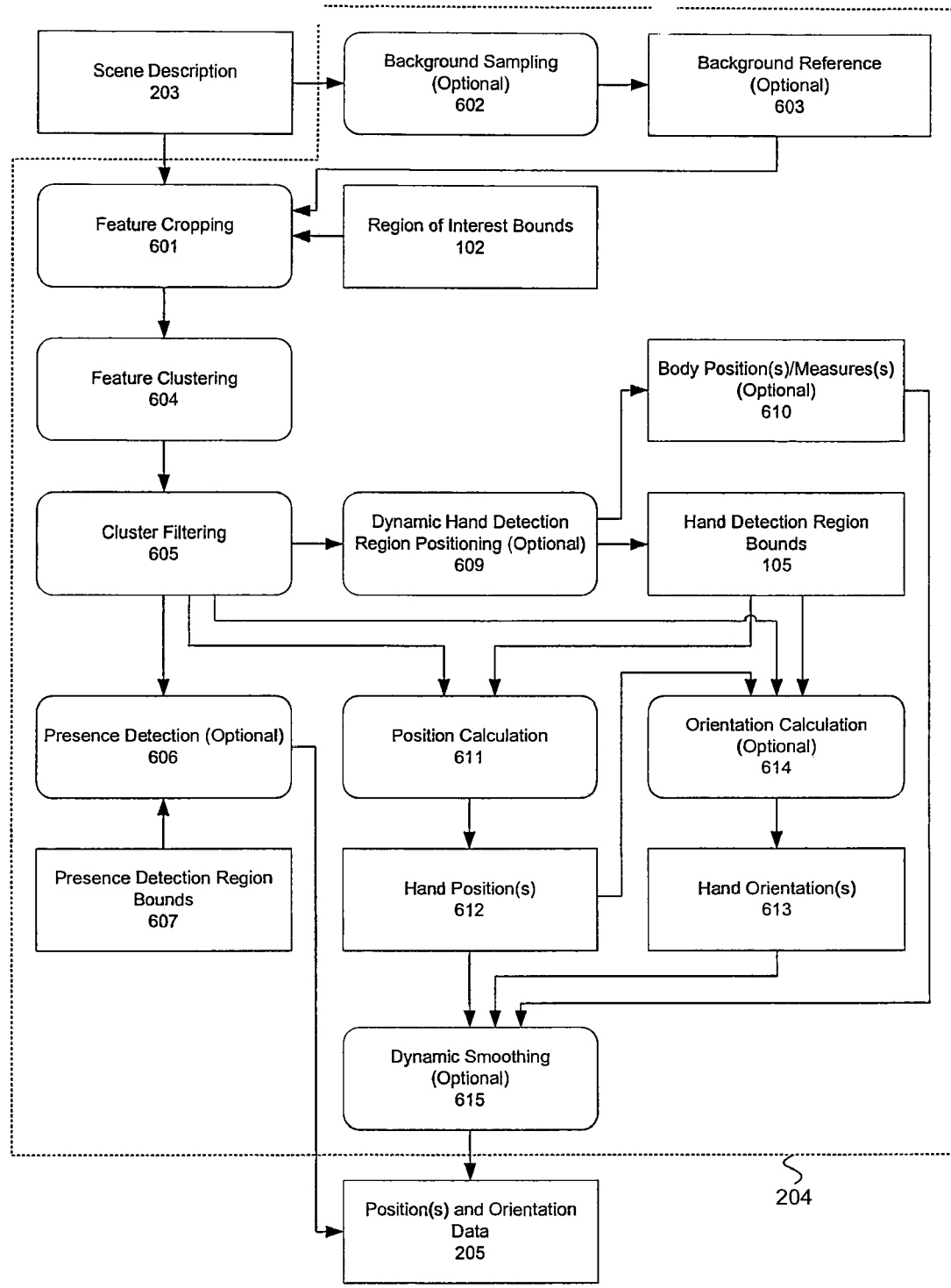
FIG. 6 is a flow diagram showing a process for transforming scene description information into position and orientation data.

FIG. 6 presents a flow diagram that summarizes an implementation of the scene analysis process 204. In the scene analysis process 204, features within the scene-description 203 are filtered by a feature cropping module 601 to exclude features with positions that indicate that the features are unlikely to belong to the user or are outside the region of interest 102. Module 601 also eliminates the background and other "distractions" (for example, another person standing behind the user).

Typically, the region of interest 102 is defined as a bounding box aligned to the world-coordinate system 106. When this is the case, module 601 may easily check whether the coordinates of each feature are within the bounding box.

Often, parts of the background can be detected to be within the region of interest 102, or a box-shaped region of interest may be incapable of definitively separating the user 101 from the background (particularly in confined spaces). When it is known that no user is within the region of interest 102, the scene description 203 is optionally sampled and modified by a background sampling module 602 to produce a background reference 603. The background reference 603 is a description of the shape of the scene that is invariant to changes in the appearance of the scene (for example, changes in illumination). Therefore, it is typically sufficient to sample the scene only when the system 100 is setup, and that reference will remain valid as long as the structure of the scene remains unchanged. The position of a feature forming part of the scene may vary by a small amount over time, typically due to signal noise. To assure that the observed background remains within the shape defined by the background reference 603, the background sampling module 602 may observe the scene description 203 for a short period of time (typically 1 to 5 seconds), and record the features nearest to the cameras 103 for all locations. Furthermore, the value defined by those features is expanded further by a predetermined distance (typically the distance corresponding to a one pixel change in disparity at the features' distances). Once sampling is complete, this background reference 603 can be compared to scene descriptions 203, and any features within the scene description 203 that are on or behind the background reference are removed by the feature cropping module 601.

After feature cropping, the next step is to cluster the remaining features into collections of one or more features by way of a feature clustering process 604. Each feature is compared to its neighbors within a predefined range. Features tend to be distributed more evenly in their image coordinates than in their transformed coordinates, so the neighbor distance typically is measured using the image coordinates. The maximum acceptable range is pre-defined, and is dependent on the particular stereo analysis process, such as stereo analysis process 202, that is used. The stereo analysis process 202 described above produces relatively dense and evenly distributed features, and therefore its use leads to easier clustering than if some other stereo processing techniques are used. Of those feature pairs that meet the criteria to be considered neighbors, their nearness in the axis most dependent on disparity (z-axis in those scenarios where the cameras are positioned in front of the region of interest, or the y-axis in those scenarios where the cameras are positioned above the region of interest) is checked against a predefined range. A cluster may include pairs of features that do not meet these criteria if there exists some path through the cluster of features that joins those features such that the pairs of features along this path meet the criteria.

Continuing with this implementation, clusters are filtered using a cluster filtering process 605 to assure that the cluster has qualities consistent with objects of the kinds expected to be present within the region of interest 102, and are not the result of features whose position (or disparity) has been erroneously identified in the stereo processing routine. Also, as part of the cluster filtering process 605, clusters that contain too few features to provide a confident measure of their size, shape, or position are eliminated. Measurements of the cluster's area, bounding size, and count of features are made and compared to predefined thresholds that describe minimum quantities of these measures. Clusters, and their features, that do not pass these criteria are removed from further consideration.

The presence or absence of a person is determined by a presence detection module 606 in this implementation. The presence detection module 606 is optional because the information that this component provides is not required by all systems. In its simplest form, the presence detection module 606 need only check for the presence of features (not previously eliminated) within the bounds of a predefined presence detection region 607. The presence detection region 607 is any region that is likely to be occupied in part by some part of the user 101, and is not likely to be occupied by any object when the user is not present. The presence detection region 607 is typically coincident to the region of interest 102. In specific installations of this system, however, the presence detection region 607 may be defined to avoid stationary objects within the scene. In implementations where this component is applied, further processing may be skipped if no user 101 is found.

In the described implementation of system 100, a hand detection region 105 is defined. The method by which this region 105 is defined (by process 609) is dependent on the scenario in which the system is applied, and is discussed in greater detail below. That procedure may optionally analyze the user's body and return additional information including body position(s)/measure(s) information 610, such as the position of the person's head.

The hand detection region 105 is expected to contain nothing or only the person's hand(s) or suitable pointer. Any clusters that have not been previously removed by filtering and that have features within the hand detection region 105 are considered to be, or include, hands or pointers. A position is calculated (by process 611) for each of these clusters, and if that position is within the hand detection region 105, it is recorded (in memory) as hand position coordinates 612. Typically, the position is measured as a weighted mean. The cluster's feature (identified by 1005 of the example presented in FIG. 10) that is furthest from side of entry (1002 in that example) of the hand detection region 105 is identified, and its position is given a weight of 1 based on the assumption that it is likely to represent the tip of a finger or pointer. The remaining weights of cluster features are based on the distance back from this feature, using the formula of Eq. 4 provided below. If only one hand position is required by the application and multiple clusters have features within the hand detection region 105, the position that is furthest from the side of entry 1002 is provided as the hand position 612 and other positions are discarded. Therefore, the hand that reaches furthest into the hand detection region 105 is used. Otherwise, if more than two clusters have features within the hand detection region 105, the position that is furthest from the side of entry 1002 and the position that is second furthest from the side of entry 1002 are provided as the hand positions 612 and other positions are discarded. Whenever these rules cause a cluster to be included in place of a different cluster, the included, clusters are tagged as such in the hand position data 612.

In those scenarios where the orientation of the cameras is such that the person's arm is detectable, the orientation is represented as hand orientation coordinates 613 of the arm or pointer, and may optionally be calculated by a hand orientation calculation module 614. This is the case if the elevation of the cameras 103 is sufficiently high relative to the hand detection region 105, including those scenarios where the cameras 103 are directly above the hand detection region 105.

The orientation may be represented by the principal axis of the cluster, which is calculated from the moments of the cluster.

An alternative method that also yields good results, in particular when the features are not evenly distributed, is as follows. The position where the arm enters the hand detection region 105 is found as the position where the cluster is dissected by the plane formed by that boundary of the hand detection region 105. The vector between that position and the hand position coordinates 612 provides the hand orientation coordinates 613.

Figure 7:
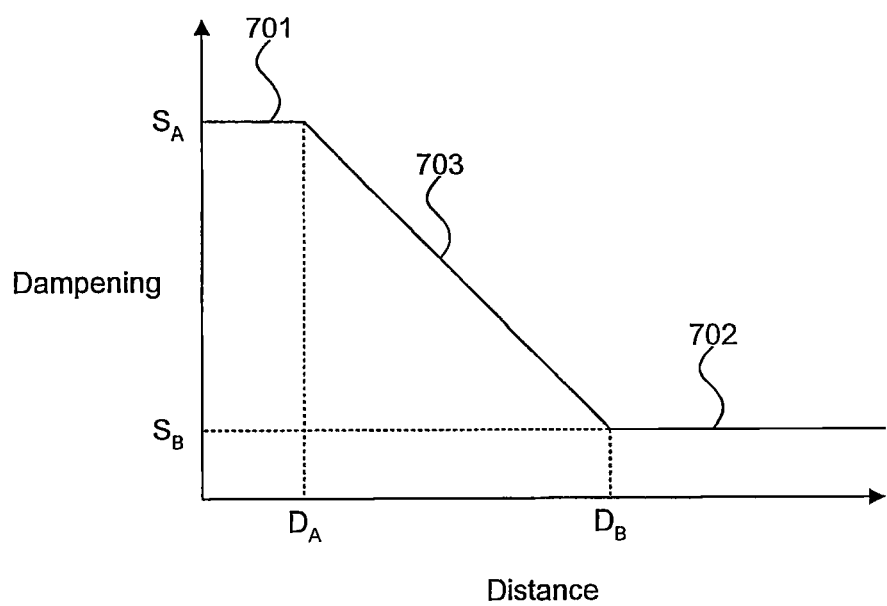
FIG. 7 is a graph showing the degree of damping S as a function of distance D expressed in terms of change in position.

A dynamic smoothing process 615 may optionally be applied to the hand position coordinate(s) 612, the hand orientation(s) coordinates 613 (if solved), and any additional body positions or measures 610. Smoothing is a process of combining the results with those solved previously so that motion is steady from frame to frame. The one particular of smoothing for these particular coordinate values, each of the components of the coordinate, that is x, y, and z, are smoothed independently and dynamically. The degree of dampening S is calculated by Eq. 5, which is provided below, where S is dynamically and automatically adjusted in response to the change in position. Two distance thresholds, $D_A$ and $D_B$, as shown in FIG. 7, define three ranges of motion. For a change in position that is less than $D_A$, motion is heavily dampened in region 701 by $S_A$, thereby reducing the tendency of a value to switch back and forth between two nearby values (a side effect of the discrete sampling of the images). A change in position greater than $D_B$ is lightly dampened in region 702 by $S_B$, or not dampened. This reduces or eliminates lag and vagueness that is introduced in some other smoothing procedures. The degree of dampening is varied for motion between $D_A$ and $D_B$, the region marked as 703, so that the transition between light and heavy dampening is less noticeable. Eq. 6, which is provided below, is used to solve the scalar a, which is used in Eq. 7 (also provided below) to modify the coordinate(s). The result of dynamic smoothing process 615 is the hand/object position information 205 of FIG. 2. Smoothing is not applied when process 611 has tagged the position as belonging to a different cluster than the previous position, since the current and previous positions are independent.

The described method by which the hand detection region 105 is determined at step 609 is dependent on the scenario in which the image control system 100 is applied. Two scenarios are discussed here.

Figure 8:
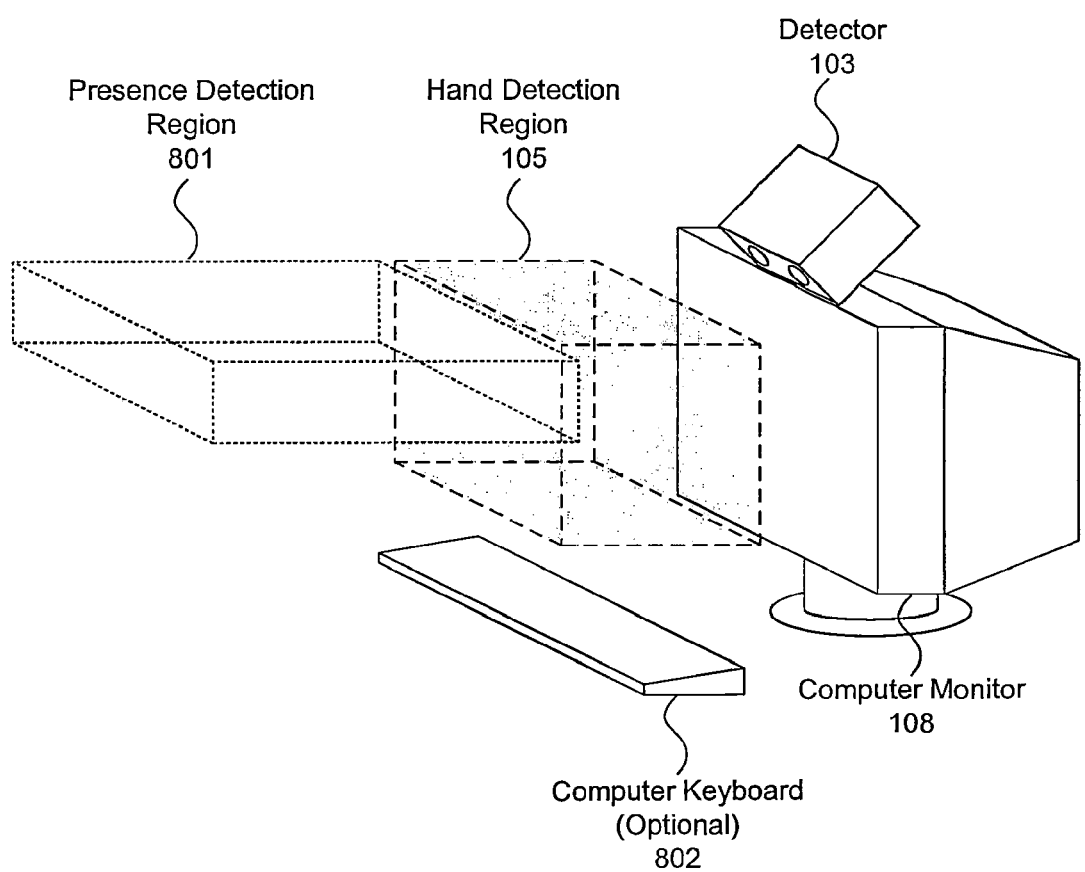
FIG. 8 shows an implementation of the image control system in which an object or hand detection region is established directly in front of a computer monitor screen.

The simplest hand detection region 105 is a predetermined fixed region that is expected to contain either nothing or only the person's hand(s) or pointer. One scenario where this definition applies is the use of system 100 for controlling the user interface of a personal computer, where the hand detection region 105 is a region in front of the computer's display monitor 108, and above the computer's keyboard 802, as depicted in FIG. 8. In the traditional use of the computer, the user's hands or other objects do not normally enter this region. Therefore, any object found to be moving within the hand detection region 105 may be interpreted as an effort by the user 101 to perform the action of "pointing", using his or her hand or a pointer, where a pointer may be any object suitable for performing the act of pointing, including, for example, a pencil or other suitable pointing device. It should be noted that specific implementation of the stereo analysis process 202 may impose constraints on the types or appearance of objects used as pointers. Additionally, the optional presence detection region, discussed above, may be defined as region 801, to include, in this scenario, the user's head. The image detector 103 may be placed above the monitor 108.

In some scenarios, the hand detection region 105 may be dynamically defined relative to the user's body and expected to contain either nothing or only the person's hand(s) or pointer. The use of a dynamic region removes the restriction that the user be positioned at a predetermined position. FIG. 1 depicts a scenario in which this implementation may be employed.

Figure 9:
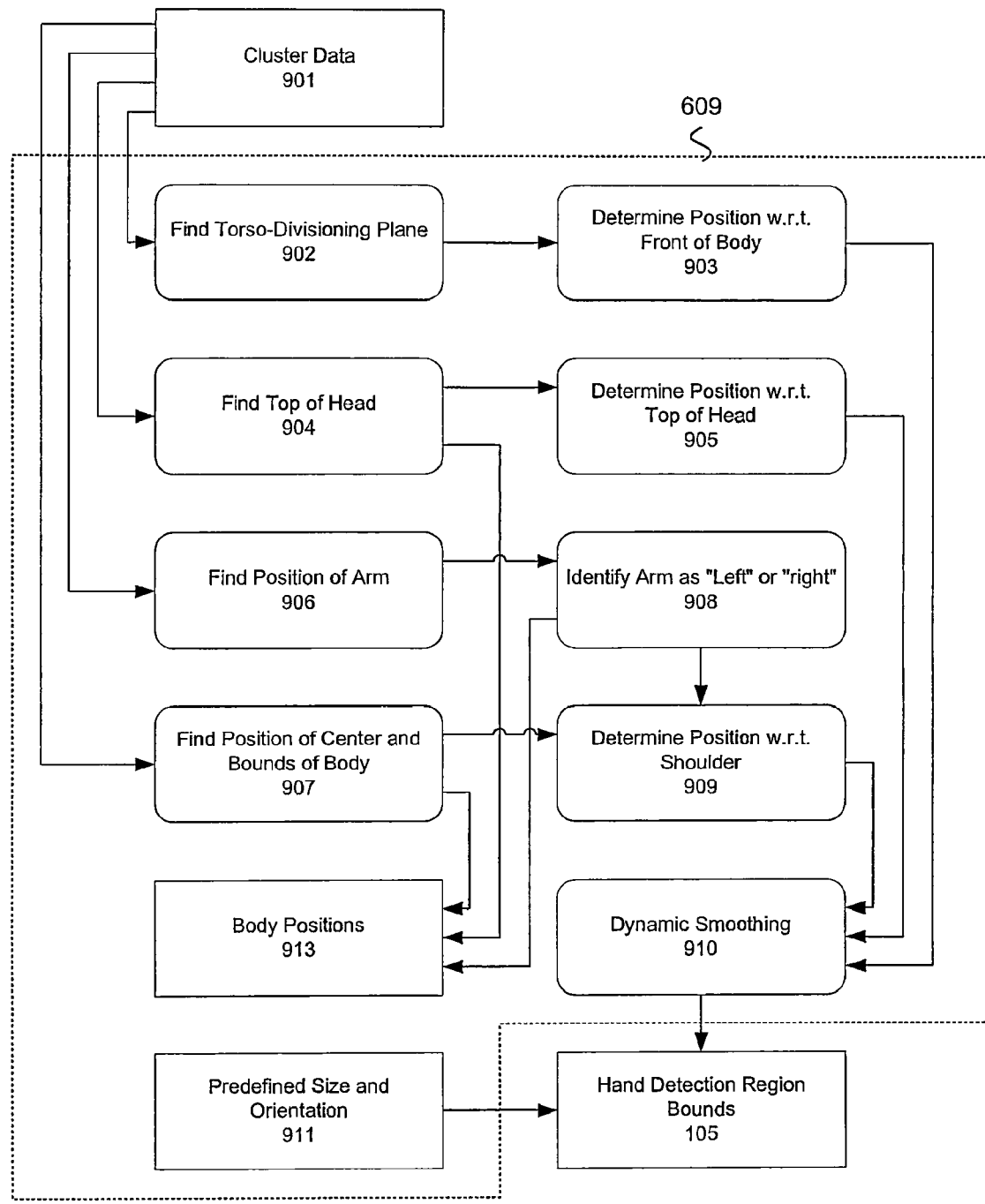
FIG. 9 is a flow diagram showing an optional process of dynamically defining a hand detection region relative to a user's body.
Figure 10A:
FIGS. 10A-10C illustrate examples of the process of FIG. 9 for dynamically defining the hand detection region relative to the user's body.
Figure 10B:
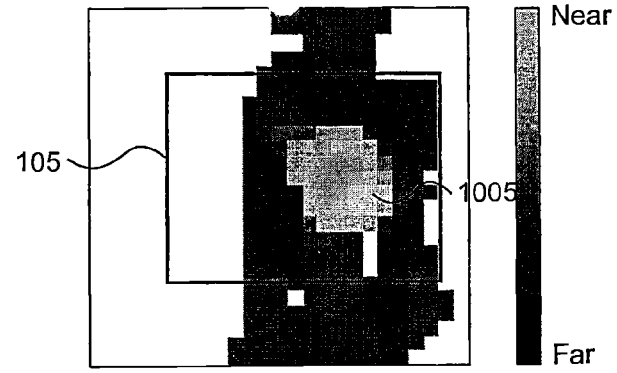
Figure 10C:
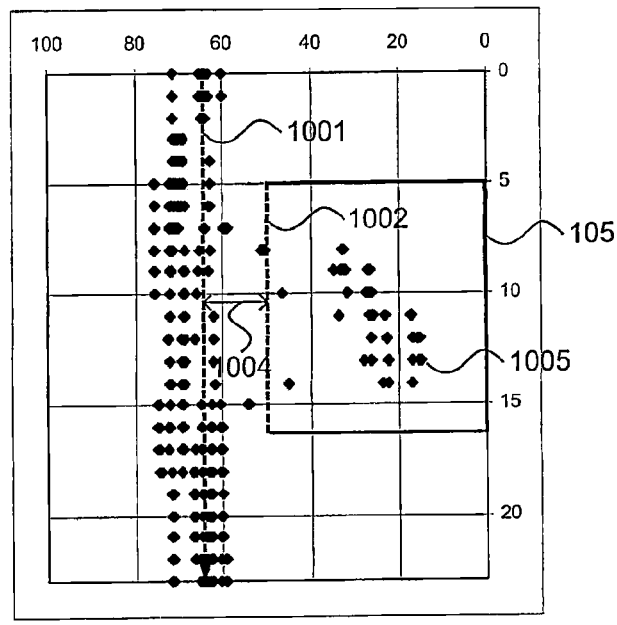

FIG. 9 shows an implementation of the optional dynamic hand detection region positioning process 609 in greater detail. In this process, the position of the hand detection region 105 on each of three axes is solved, while the size and orientation of the hand detection region 105 are dictated by predefined specifications. FIGS. 10A-10C present an example that is used to help illustrate this process.

Using the cluster data 901 (the output of the cluster filtering process 605 of FIG. 6), the described procedure involves finding, in block 902, the position of a plane 1001 (such as a torso-divisioning plane illustrated in the side view depicted in FIG. 10C) whose orientation is parallel to the boundary 1002 of the hand detection region 105 through which the user 101 is expected to reach. If the features are expected to be evenly distributed over the original images (as is the case when the implementation of the stereo analysis process 202 described above is used), then it is expected that the majority of the remaining features will belong to the user's torso, and not his hand. In this case, the plane 1001 may be positioned so that it segments the features into two groups of equal count. If the features are expected to be unevenly distributed (as is the case when some alternative implementations of the stereo analysis process 202 are used), then the above assumption may not be true. However, the majority of features that form the outer bounds of the cluster are still expected to belong to the torso. In this case, the plane 1001 may be positioned so that it segments the outer-most features into two groups of equal count. In either case, the plane 1001 will be positioned by the torso-divisioning process in block 902 so that it is likely to pass through the user's torso.

Process block 903 determines the position of the hand detection region 105 along the axis that is defined normal to plane 1001 found above. The hand detection region 105 is defined to be a predetermined distance 1004 in front of plane 1001, and therefore in front of the user's body. In the case of FIG. 1, distance 1004 determines the position of the hand detection region 105 along the z-axis.

If the user's head is entirely within the region of interest 102, then the position of the topmost feature of the cluster is expected to represent the top of the user's head (and therefore to imply the user's height), and is found in process block 904 of this implementation. In process block 905, the hand detection region 105 is positioned based on this head position, a predefined distance below the top of the user's head. In the case of FIG. 1, the predefined distance determines the position of the hand detection region along the y-axis. If the user's height cannot be measured, or if the cluster reaches the border of the region of interest 102 (implying that the person extends beyond the region of interest 102), then the hand detection region 105 is placed at a predefined height.

In many scenarios, it can be determined whether the user's left or right arm is associated with each hand that is detected in the position calculation block 611 of FIG. 6. In process block 906, the position where the arm intersects a plane that is a predefined position in front of plane 1001 is determined. Typically, this plane is coincident to the hand detection region boundary indicated by 1002. If no features are near this plane, but if some features are found in front of this plane, then it is likely that those features occlude the intersection with that plane, and the position of intersection may be assumed to be behind the occluding features. By shortest neighbor distances between the features of the blocks, each intersection is associated with a hand point.

The position of the middle of the user's body and the bounds of the user's body are also found in process block 907. Typically, this position is, given evenly distributed features, the mean position of all the features in the cluster. If features are not expected to be evenly distributed, the alternative measure of the position halfway between the cluster's bounds may be used.

In process block 908, the arm-dependent position found by process block 906 is compared to the body centric position found by process block 907. If the arm position is sufficiently offset (e.g., by greater than a predefined position that may be scaled by the cluster's overall width) to either the left or right of the body-center position, then it may be implied that the source of the arm comes from the left or right shoulder of the user 101. If two hands are found but only one hand may be labeled as "left" or "right" with certainty, the label of the other hand may be implied. Therefore, each hand is labeled as "left" or "right" based on the cluster's structure, assuring proper labeling in many scenarios where both hands are found and the left hand position is to the right of the right hand position.

If one hand is identified by process block 908, then the hand detection region 105 may be placed (by process block 909) so that all parts of the hand detection region 105 are within an expected range of motion associated with the user's hand. The position of the hand detection region 105 along the remaining axis may be biased towards the arm of the arm as defined by Eq. 8 (which is provided below). If process block 908 failed to identify the arm, or if it is otherwise desired, the position of the hand detection region 105 along the remaining axis may be positioned at the center of the user's body as found by 907. In scenarios where tracking of both hands is desired, the hand detection region 105 may be positioned at the center of the user's body.

Process blocks 903, 906 and 909 each solve the position of the hand detection region 105 in one axis, and together define the position of the hand detection region 105 within three-dimensional space. That position is smoothed by a dynamic smoothing process 910 by the same method used by component 615 (using Eq. 5, Eq. 6, and Eq. 7). However, a higher level of dampening may be used in process 910.

The smoothed position information output from the dynamic smoothing process 910, plus predefined size and orientation information 911, completely defines the bounds of the hand detection region 105. In solving the position of the hand detection region 105, process blocks 905, 907, and 908 find a variety of additional body position measures 913 (610 of FIG. 6) of the user.

In summary, the above implementation described by FIG. 6, using all the optional components including those of FIG. 9, produces a description of person(s) in the scene (represented as the hand/object position information 205 of FIG. 2) that includes the following information:

Presence/absence or count of users
For each present user:
Left/Right bounds of the body or torso
Center point of the body or torso
Top of the head (if the head is within the region of interest)
For each present hand:
The hand detection region
A label of "Left", "Right" (if detectable)
The position of the tip of the hand
The orientation of the hand or forearm Given improvements in the resolution of the scene description 203, the implementations described here may be expanded to describe the user in greater detail (for example, identifying elbow positions).

This hand/object position information 205, a subset of this information, or further information that may be implied from the above information, is sufficient to allow the user to interact with and/or control a variety of application programs 208. The control of three applications is described in greater detail below.

Through processing the above information, a variety of human gestures can be detected that are independent of the application 208 and the specific control analogy described below. An example of such a gesture is "drawing a circle in the air" or "swiping the hand off to one side". Typically, these kinds of gestures be detected by the gesture analysis and detection process 209 using the hand/object position information 205.

A large subset of these gestures may be detected using heuristic techniques. The detection process 209 maintains a history of the hand and body positions. One approach to detecting gestures is to check if the positions pass explicit sets of rules. For example, the gesture of "swiping the hand off to one side" can be identified if the following gesture detection rules are satisfied:

1. The change in horizontal position is greater han a predefined distance over a time span that is less than a predefined limit.
2. The horizontal position changes monotonically over that time span.
3. The change in vertical position is less than a predefined distance over that time span.
4. The position at the end of the time span is nearer to (or on) a border of the hand detection region than the position at the start of the time span.

Some gestures require that multiple rule sets are satisfied in an explicit order, whereby the satisfaction of a rule set causes the system to change to a state where a different rule set is applied. This system may be unable to detect subtle gestures, in which case Hidden Markov Models may be used, as these models still allow for chains of specific motions to be detected, but also consider the overall probability that the motions sufficiently fit a gesture.

An implementation of this system provides a method of user interaction whereby the user causes a representation of an indicator to move within an image (user feedback 206) that is presented to the user on a video display 108. The indicator is made to move in a way that reflects the movements of the user's hand.

Figure 11A:
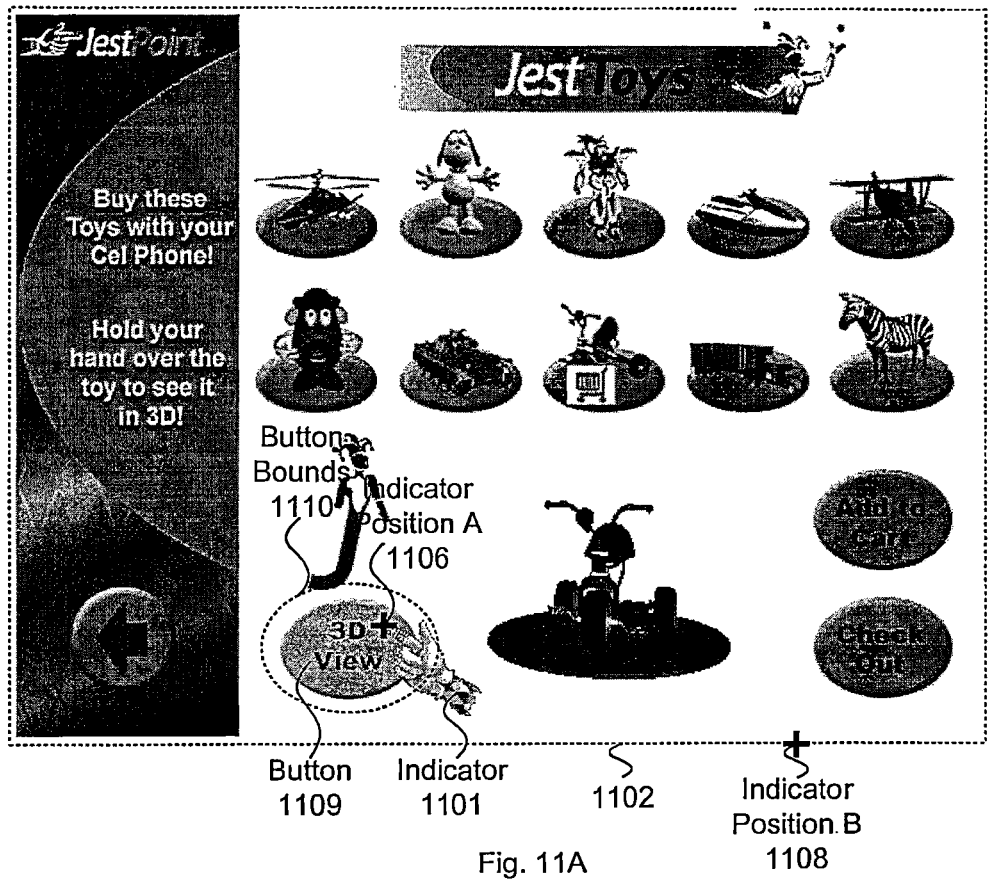
FIG. 11A shows an exemplary user interface and display region associated with the video-based image control system.

In one variation of this form of user interface, the indicator is shown in front of other graphics, and its movements are mapped to the two dimensional space defined by the surface of the video display screen 108. This form of control is analogous to that provided by a mouse commonly used with desktop computers. FIG. 11A shows an example of a feedback image 206 of an application program 208 that uses this style of control.

Figure 11B:
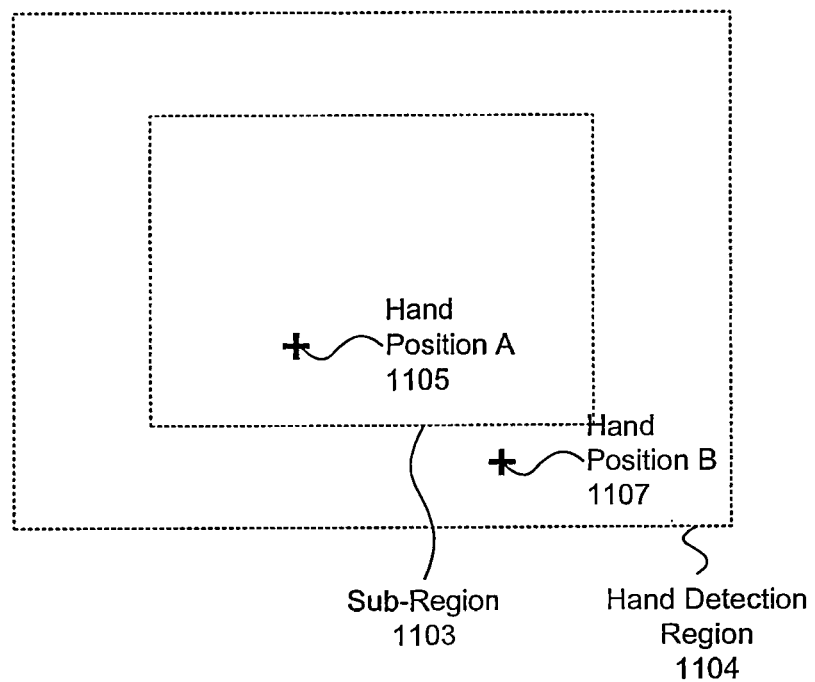
FIG. 11B shows a technique for mapping a hand or pointer position to a display region associated with the user interface of FIG. 11A.

The following describes a method by which, in the position mapping process 207, a hand position 205, detected by the scene analysis process 204 as previously described, is mapped into the position where the screen pointer or cursor 1101 is overlaid onto the screen image 206 presented on the video display 108. When one hand is detected and found to be within the hand detection region 105, then the hand position 205 relative to the hand detection region 105 is mapped by the position mapping process 207 into coordinates relative to the video display 108 before it is conveyed to the application program 208. One method of mapping the coordinates is through the application of Eq. 9 (which is shown below) for the x coordinate and the equivalent for the y coordinate. As illustrated in FIG. 11B, the entire display region 1102 is represented by a sub-region 1103 contained entirely within the hand detection region 1104 (analogous to hand detection region 105). Positions (for example, hand position 1105) within the sub-region 1103 are linearly mapped to positions (for example, 1106) within the display region 1102. Positions (for example, 1107) outside the sub-region 1103 but still within the hand detection region 1104 are mapped to the nearest position (for example, 1108) on the border of the display region 1102. This reduces the likelihood of the user unintentionally removing the hand from the sub-region 1103 while attempting to move the cursor 1101 to a position near a border of the display. If both of the user's hands are detected within the hand detection region 105, then one hand is selected in position mapping process 207. Typically, the hand that is reaching furthest into the hand detection region 105 is selected. That hand is detectable as the hand that has, depending on the configuration of this system and the definition of the world coordinate system 106, either the largest or smallest x, y, or z coordinate value.

An application that uses this style of interaction typically presents graphic representations of data or controls (for example, a button 1109). The user is expected to cause the indicator 1101 to be positioned over one of these objects. This condition may be detected by comparing the remapped indicator position 1106 to the bounds (for example, 1110) of the graphic representation of the object, where this condition is true if the indicator position is within the object bounds. The user optionally receives feedback indicating that the cursor is positioned over an object. Feedback may be of a variety of forms, including an audio cue and/or a change in the graphical representation of either or both the cursor and the object. The user then may activate, manipulate, or move the object that is under the cursor.

The user is expected to indicate his intention to activate, manipulate, or move the object by performing a gesture. In the implementation of this system presented here, the gesture analysis process 209 identifies as gestures patterns in the changes of the hand position or other positions and measures provided by either or both of scene analysis process 204 and position mapping process 207. For example, the user may indicate an intention to activate the object that is under the cursor is to cause the cursor to remain over the object for longer than a predefined duration. Detection of this gesture requires that the state 210 of the application, in particular the bounds and/or state of the object, be fed back into the gesture analysis process 209. The application need not be created specifically for this system, as techniques exist that can unobtrusively monitor an application's state 210 and, using the coordinates provided by the position mapping process 207, emulate other interface devices such a computer mouse.

In some scenarios, the application state information 210 may not be available and may not be monitored. In this case, gestures that indicate the intention to activate the object under the cursor include holding the hand stationary ("hovering"), or poking the hand quickly forward and back.

A method by which "hovering" has been detected is by keeping a history of the position of the hand, where that history contains all records of the hand position and state for a predefined duration of time that ends with the most recent sample. That duration represents the minimum duration that the user must hold the hand stationary. The minimum and maximum position, separately in each of the three (x, y, z) dimensions, is found within the history. If the hand was present in all samples of the history, and the distance between the minimum and maximum is within a predefined threshold for each of the three dimensions, then the "hovering" gesture is reported. Those distance thresholds represent the maximum amount that the hand is allowed to move, plus the maximum amount of variation (or "jitter") expected to be introduced into the hand position by the various components of the system. The typical method in which this gesture is reported, where the system is emulating a mouse as described above, is to emulate a mouse "click". Gestures representing additional operations of the mouse, "double clicks" and "dragging", have also been detected and those operations have been emulated.

In addition, gestures that are independent of the position of the indicator relative to an object may optionally be detected and given meaning by the application, either with or without regard to the application's state. An application that uses this style of interaction typically does not explicitly use or display the user's hand or other positions. These applications can be wholly or primarily controlled with only the interpretations of the positions made by this system. These applications also need not be created specifically for this system because the interpretations made by this system can be used to simulate an action that would be performed on a traditional user input device, such as a keyboard or joystick.

Many useful interpretations depend directly on the absolute position of the hand within the hand detection region 105. One method of making these interpretations is to define boxes, planes, or other shapes. A state is triggered on if the hand position is found to be within a first box (or beyond the border defined by the first plane), and had not been in the immediately preceding observation (either because it was elsewhere within the hand detection region 105, or was not detected). This state is maintained until the hand position is not found to be within a second box (or beyond the border defined by the second plane), at which time the state is triggered off. The second box must contain the entire first box, and, in general, is slightly larger. The use of a slightly larger box reduces occurrences of the state unintentionally triggering on and off when the hand position is held near the border of the boxes. Typically, one of three methods of interpreting this state is used, depending on the intended use of the gesture. In one method, the gesture directly reflects the state with an on and off trigger. When emulating a keyboard key or joystick fire button, the button is "pressed" when the state is triggered on, and "released" when the state is triggered off. In the other common method, the gesture is only triggered by the transition of the state from off to on. When emulating a keyboard key or joystick button, the key is "clicked". Although the duration and off state are not reported to the application, they are maintained so that the gesture will not be repeated until after the state is triggered off, so that each instance of the gesture requires a clearly defined intent by the user. The third method typically employed is to trigger the gesture by the transition of the state from off to on, and to periodically re-trigger the gesture at predefined intervals so long as the state remains on. This emulates the way in which holding a key down on a keyboard causes the character to repeat in some applications.

Figure 15A:
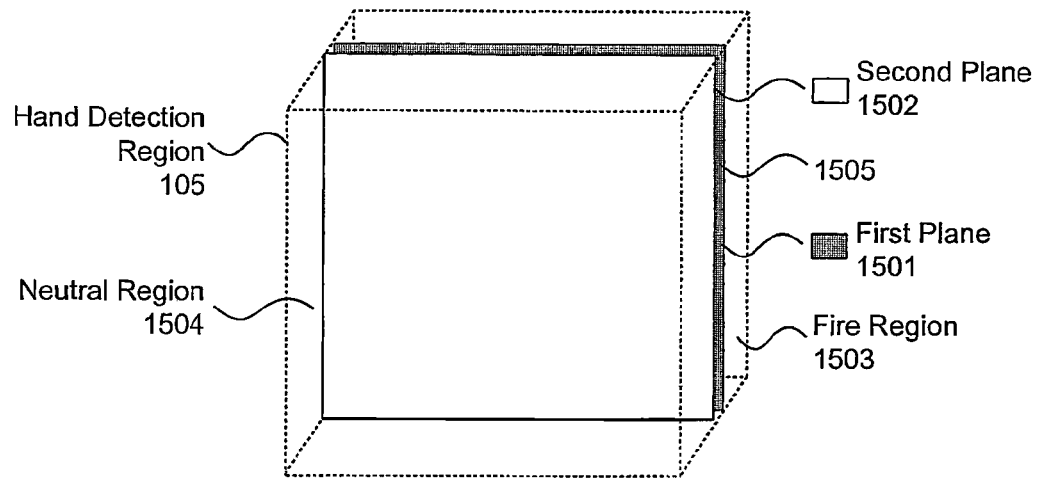
FIG. 15A is a diagram showing an exemplary hand detection region divided into detection planes.

One way in which boxes or planes for the above techniques may be defined within the hand detection region 105 is as follows. By defining a first plane (1501 in FIG. 15A) and second plane 1502 that divides the hand detection region 105 into "fire" 1503 and "neutral" 1504 regions (the gesture reported when the hand is in the region 1505 between the planes depends on the previous positions of the hand, as described above), the above technique can detect a hand "jabbing" forward, which is one gesture for emulating a fire button on a joystick, or causing the application to respond in a way that is commonly associated with the pressing of a joystick button (for example, the firing of a weapon in a video game).

Figure 15B:
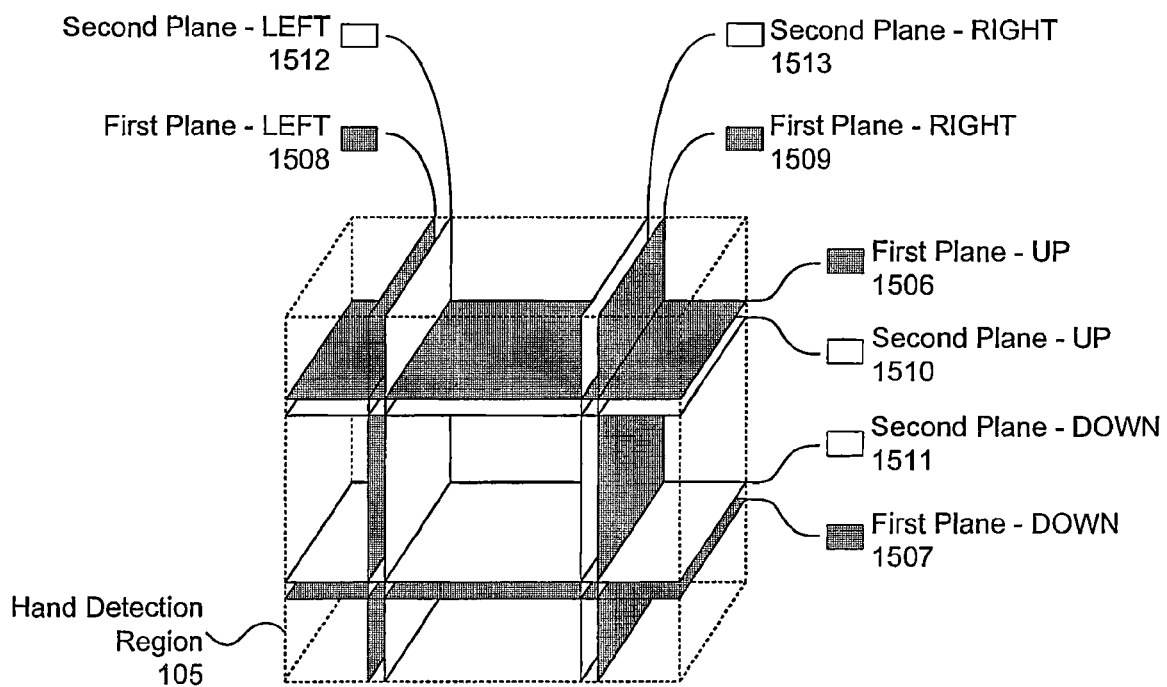
FIG. 15B is a diagram showing an exemplary hand detection region divided into detection boxes.

Another way in which boxes or planes for the above techniques may be defined within the hand detection region 105 is as follows. Planes of the first type 1506, 1507, 1508, 1509 are defined that separate each of the left, right, top and bottom portions of the hand detection region 105, overlapping in the corner regions as illustrated in FIG. 15B. Planes of the second type are labeled as 1510, 1511, 1512, 1513. Each pair of first and second planes is processed independently. This combination of planes emulates the four directional cursor keys, where a hand in a corner triggers two keys, commonly interpreted by many applications as the four secondary 45 degree (diagonal) directions.

Figure 15C:
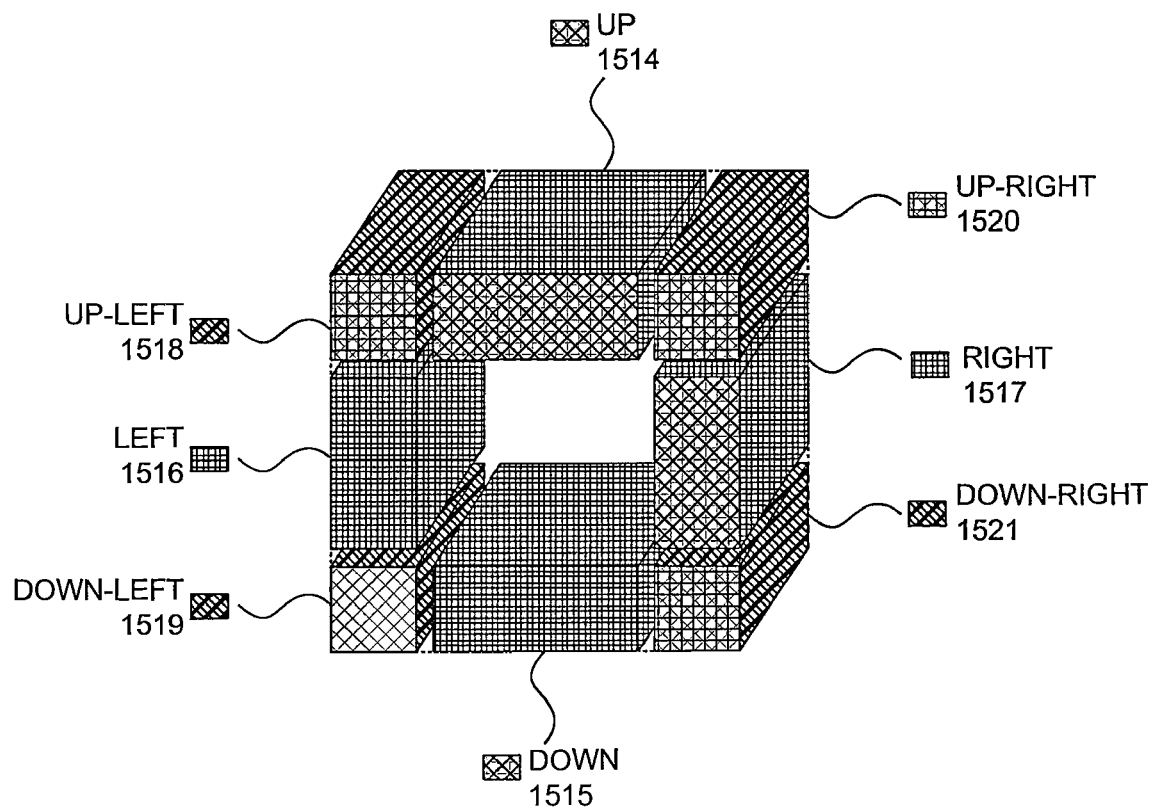
FIGS. 15C and 15D are diagrams showing an exemplary hand detection region divided into two sets of direction detection boxes, and further show a gap defined between adjacent direction detection boxes.
Figure 15D:
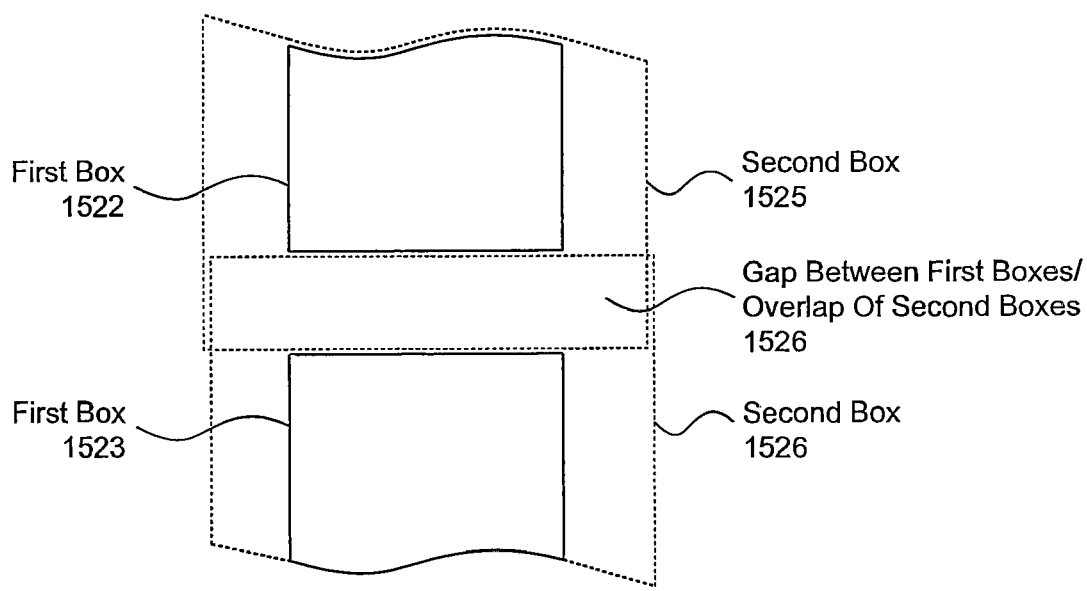

Referring to FIG. 15C, an alternative method is shown for emulating control of discrete directions and applies for applications that expect the four 45 degree direction states to be explicitly represented. Boxes 1514, 1515, 1516, 1517 are defined for each of the four primary (horizontal and vertical) directions, with additional boxes 1518, 1519, 1520, 1521 defined for each of the secondary 45 degree (diagonal) directions. For clarity, only boxes of the first type are illustrated. A gap is placed between these boxes. FIG. 15D illustrates how neighboring boxes are defined. The gap between boxes of the first type 1522, 1523 assures that the user intentionally enters the box, while the gap 1524 is filled by overlapping boxes of the second type 1525, 1526, so that the system will report the previous gesture until the user was clearly intended to move into the neighboring box. This combination of buttons can be used to emulate an eight-directional joystick pad.

A wider class of gestures depend on motion instead of or in addition to position. An example is the gesture of "swiping the hand to the left". This gesture may be used to convey to an application that it is to return to a previous page or state. Through emulation of a keyboard and mouse, this gesture causes presentation software, in particular PowerPoint, to go to the previous slide of a presentation sequence. Through emulation of a keyboard and mouse, this gesture causes a web browser to perform the action associated with its "back" button. Similarly, the gesture of "swiping the hand to the right" is a gesture that may be used to convey to an application that the user desires to go to the next page or state. For example, this gesture causes presentation software to go to the next slide of a presentation sequence, and causes browser software to go to the next page.

Using the method of dividing the hand detection region 105 into regions by separated planes, a method for detecting the "swiping the hand to the left" gesture that is simpler than that presented earlier is as follows. A thin stripe along the leftmost part of the hand detection region 105 is defined as the left-edge region. The hand position is represented as the following three states:

1. The hand is present and not inside the left-edge region
 2. The hand is present and inside the left-edge region
 3. The hand is not present within the hand detection region A transition from state 1 to state 2 above causes the gesture detection process 209 to enter a state whereby it starts a timer and waits for the next transition. If a transition to state 3 is observed within a predetermined duration of time, the "swiping the hand off to the left" gesture is reported to have occurred. This technique is typically duplicated for the right, upper, and lower edges, and, because the hand position is found in three dimensions, also duplicated to detect "pulling the hand back". All of the above gestures may be detected using the position of either the head or torso instead of the hand.

In another variation of this system, the user causes a representation of an indicator, or two indicators (one for each hand), to move within a representation (user feedback 206) of a three-dimensional virtual environment. The feedback may be provided by stereoscopic means whereby each of the user's eyes view a unique image creating an illusion of depth, although this type of system is impractical in many scenarios, and is therefore optional. It is otherwise possible, however, to imply the depth of objects by rendering the virtual environment using projective transforms. An example of use of this type of rendering is provided in FIGS. 12A, 12B, and 13A.

Figure 12A:
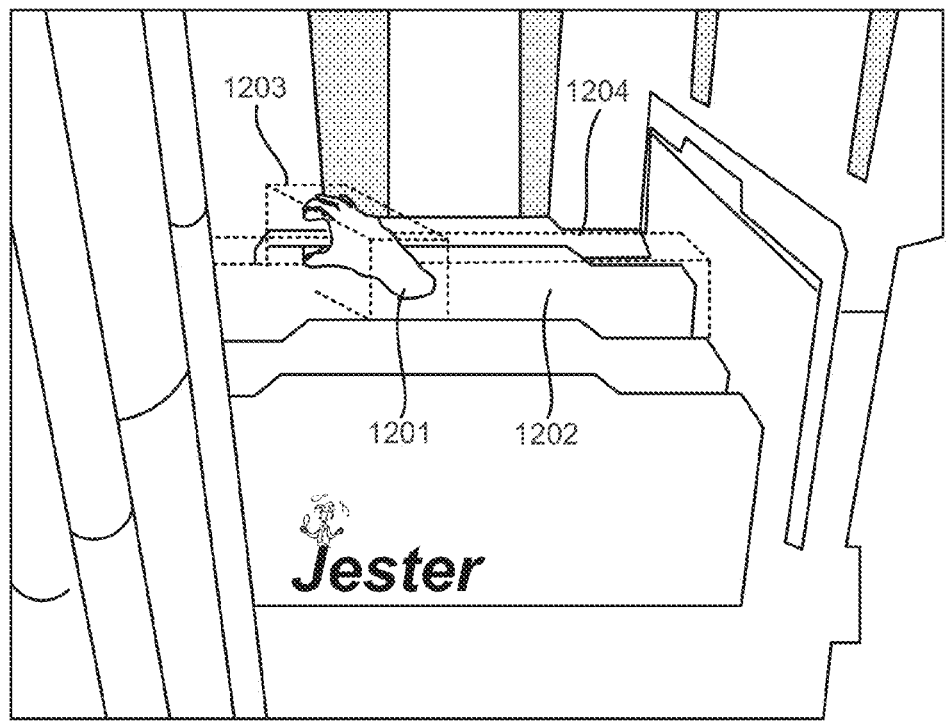
FIG. 12A illustrates an exemplary three-dimensional user interface represented in a virtual reality environment.
Figure 12B:
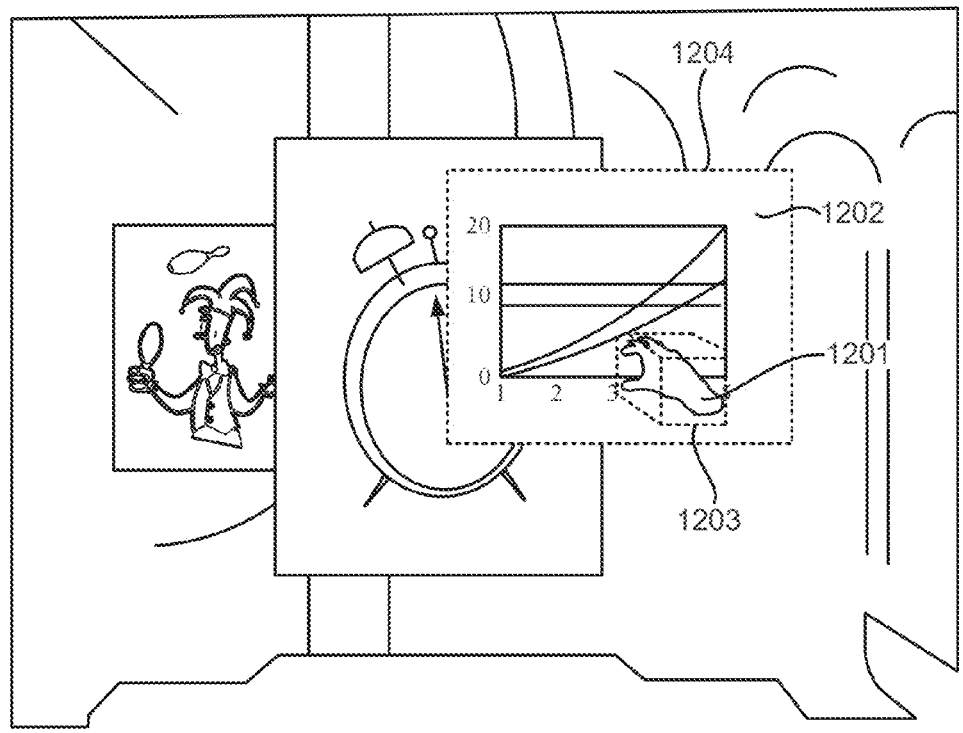
FIG. 12B illustrates the three-dimensional user interface of FIG. 12A in which contents of a virtual file folder have been removed for viewing.
Figure 13A:
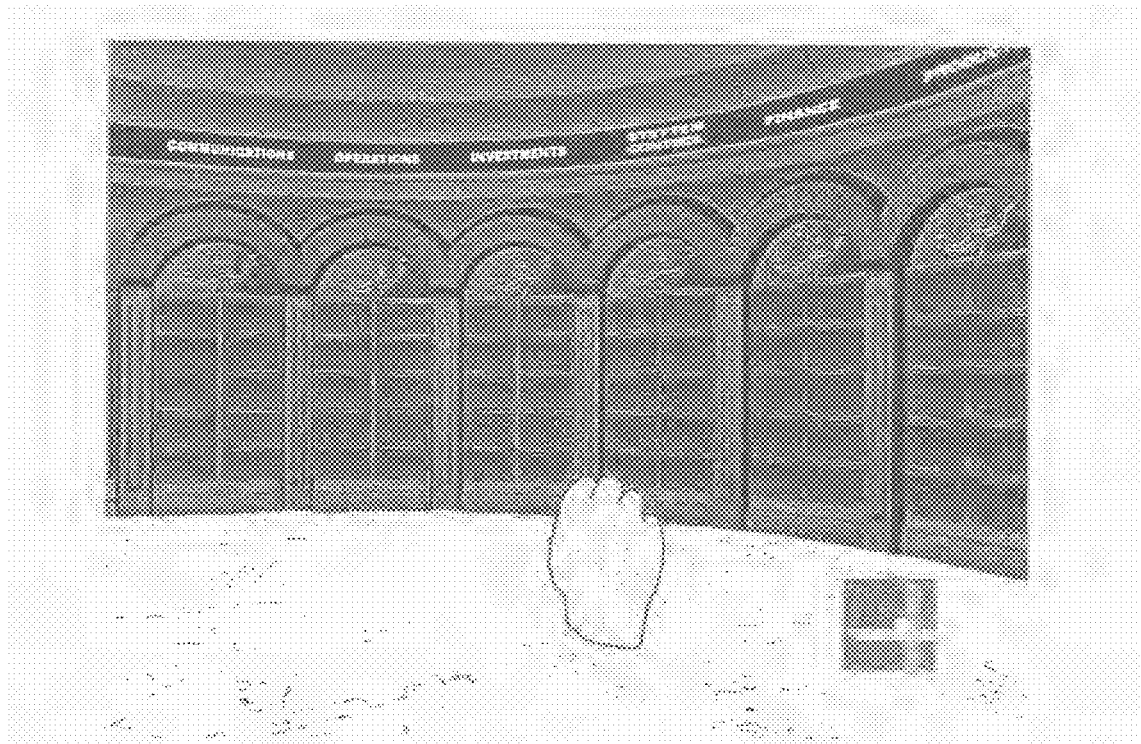
FIG. 13A illustrates an exemplary representation of a three-dimensional user interface for navigating through a virtual three-dimensional room.

Referring to FIG. 12A, the following describes a method by which, in the position mapping process 207, a hand position 205, detected by the scene analysis process 204 as previously described, is mapped into the position where the indicator 1201 is positioned within the virtual environment. Hand position(s) 205 relative to the hand detection region 105 are mapped by the position mapping process 207 into coordinates relative to the video display 108 before being conveyed to the application program 208. One method of mapping the coordinates is through the application of Eq. 9 for the x coordinate and the equivalent for the y and z coordinates. This is similar to the method described previously, except that a third dimension has been added.

Given the ability of the user to manipulate the position of the indicator 1201 in all three dimensions, the user 101 may cause the indicator(s) to touch objects (for example, 1202) within the virtual environment like he would in the real environment. This is one method of user interaction with a virtual environment. The bounds (for example, 1203 and 1204), which may be represented as a cube or sphere, of the indicator and object are compared. The condition where the two bounds intersect indicates that the indicator is touching the object. It is possible, given well laid out objects, for the user to cause the indicator to move to a position that "touches" an object, where the path of the indicator avoids "touching" any other objects. Therefore, a "touch" generally signals the user's intention to activate, manipulate, or move the object. Therefore, unlike two-dimensional control, three-dimensional control of the indicator 1201 eliminates the need for an explicit gesture to initiate one of these actions. Also, unlike two-dimensional control, objects may be laid out at different depths (as are the file folders in FIG. 12A), to provide an interface that is a closer analogy to actions that the user may be familiar with performing in the real world. In addition, gestures that are independent of the position of the indicator 1201 relative to an object may optionally be detected to indicate the intention to perform an action.

It is possible for the user to navigate within a virtual environment using this system. Navigation allows the user access to more objects or information than may be represented in the user feedback 206 at one time, by allowing the user to cause the selection of a subset of the objects or information to be represented. Navigation may optionally be of a form whereby the user 101 roams within a virtual environment and the subset of objects or information available to the user is dependent on the user's positions within the virtual environment. An example is presented in FIG. 13A, where the user may roam within the virtual room to reach any of several collections of objects that are represented as filing cabinets.

Next, a method by which the user roams within a virtual environment is described. The video display image 206 is rendered in such a way that it represents the virtual environment as viewed by a virtual camera, whereby any objects within the field of view of the virtual camera, and not occluded by other virtual objects, are presented to the user. In one option, referred to as "first person", the position of the camera represents the position of the user within the virtual environment. In another option, an indicator represents the position of the user within the virtual environment. This indicator may optionally be an avatar (presented on the video display 108) that represents the user 101. The virtual camera position is caused to follow the indicator so that the indicator and all objects accessible to the user from the current user position are within the virtual camera's field of view.

Either the user's hand, body or head position may affect the user's virtual position when roaming. A position representing the center of the user's torso or the top of his head is found in some implementations of this system, in particular those implementations in which the optional gesture analysis process 609 is performed in its entirety as outlined by FIG. 9. The use of either of these positions allows the user 101 to perform the action of roaming independently of the position of his hands, permitting the hands to be used to "touch" virtual objects while roaming. Note that these touchable objects may be fixed in position relative to the virtual environment, or fixed in position relative to the virtual camera and therefore always available to the user. If these positions are not available, or it is otherwise desired, the user's hand position may be used to control roaming. In this case, the system may automatically switch to the touch context when the user has roamed near touchable virtual objects, or has preformed a predefined gesture.

Figure 13B:
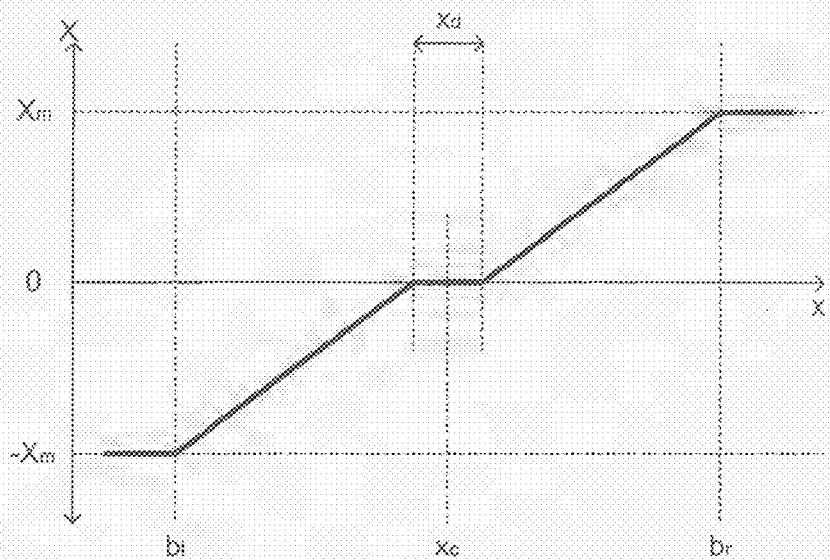
FIG. 13B is a graph showing coordinate regions which are represented in the image control system as dead zones, in which there is no implied change in virtual position.

To provide a region where no change to the virtual position is implied, called a dead zone, the position (either hand, torso, or head) may be remapped by application of Eq. 10, (and similar equations for the y and z coordinates), which results in the relationship illustrated by the graphs in FIG. 13B. Note that the bounds and neutral position may be coincident to the hand detection region 105 and its center, or another region that is dynamically adjusted to accommodate the user.

When the torso or head is used, the bounds and neutral position, as used in Eq. 10 may be adjusted to accommodate the user as follows. First, the neutral position $x_c$, $y_c$, $z_c$ used in Eq. 10 may correspond to the neutral position of the user's body. All users, after approaching the system, may not stand in the exact same location. After the user 101 has been given time to enter the region of interest 102, the user's torso or head position is sampled and used as the neutral position. The maximum range of motion, that is the distance in which a user is expected to comfortably move (or "lean") in each axis, is predefined. To assure that the user remains within the region of interest 102 while moving to these extreme positions, the neutral position $x_c$ is bounded to within the region of interest 102 by a minimum of one half of the maximum range of motion described above, plus one half the typical body size, in each of the x, y, and z dimensions. The bounds $b_l$ and $b_r$ are placed relative to the neutral position, with each being one half the maximum range of motion from the neutral position.

Gestures, as discussed earlier, may be based on the position and/or motion of the head or torso instead of the hand. In this case, the region defined by these bounds is used instead of the hand detection region 105.

Figure 14:
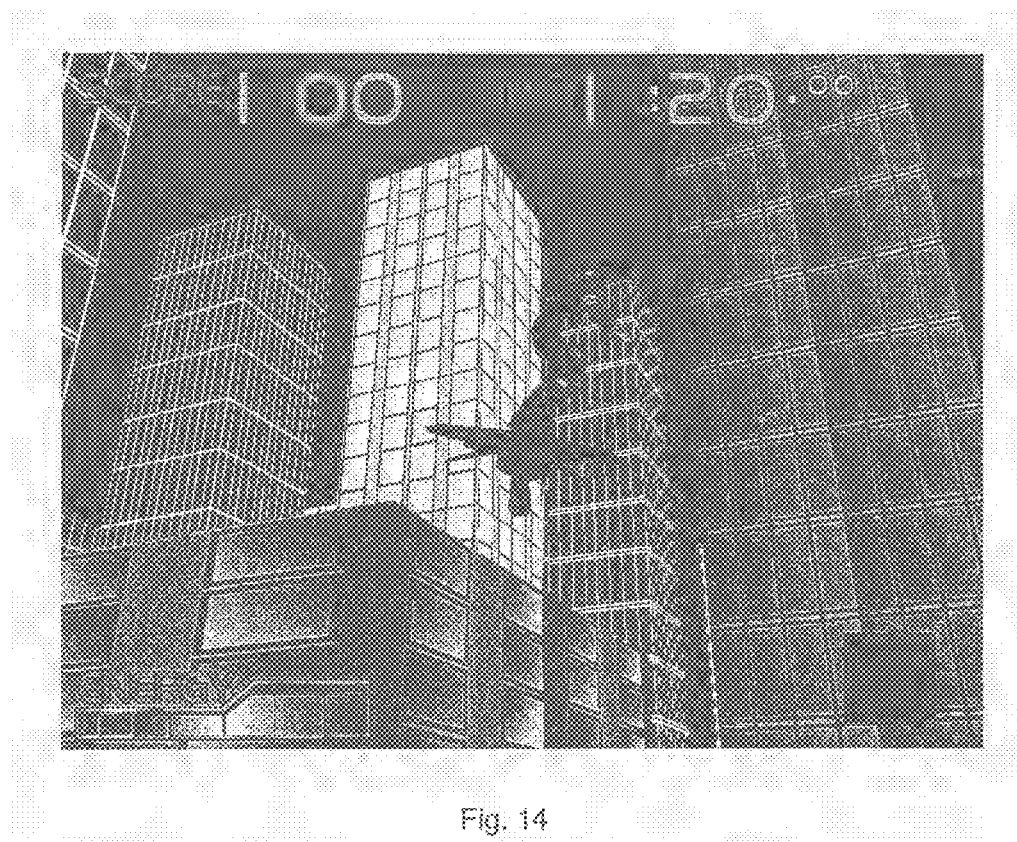
FIG. 14 shows an exemplary implementation of a video game interface in which motions and gestures are interpreted as joystick type navigation control functions for flying through a virtual three-dimensional cityscape.

Horizontal motions of the user (along the axis labeled x in the example of FIG. 1) cause the view of the virtual environment to look left or right. The horizontal position, transformed by Eq. 10, is applied as a velocity function onto rotation about the virtual vertical axis, causing the indicator and/or camera to yaw. It is optional that vertical motions of the user (along the axis labeled y in the example of FIG. 1) cause the virtual view to look up or down. The vertical position, transformed by Eq. 10, is interpreted directly as the angle of rotation about the horizontal axis, causing the indicator and/or camera to pitch. Motions of the user 101 to or from (along the axis labeled z in the example of FIG. 1) the display cause the virtual position to move forward or backwards. One style of motion is analogous to "walking", where the indicator and/or camera remains a predefined height above a virtual "floor", and follows any contours of the floor (for example, move up a set of virtual stairs). The transformed position is applied as a velocity onto the vector that is the projection of the indicator and/or camera's orientation onto the plane defined by the "floor". Another style of motion is analogous to "flying". If this is desired, the transformed position is applied as a velocity onto the vector defined by the indicator and/or camera's orientation. An example of a virtual environment, which is navigated by the "flying" method of control as described, is shown in FIG. 14. The user's torso position, found by the methods described earlier and using the mapping of Eq. 10 and adaptive neutral position as described previously, is used in this example.

The indicator used in the virtual environment, whether or not the above method by which the user controls or roams in the virtual environment is utilized, may take the form of an avatar. An avatar typically takes the form of a human-like body, as in 1401 of FIG. 14. The positions found by this system provide sufficient information to animate the virtual human-like form.

This system finds both of the user's hands when they are within the hand detection region 105. These positions are remapped to corresponding positions in front of the avatar's torso, allowing the avatar's hands to reach to the same positions as the user is reaching to. A user's hand is not found or selected when the hand is not within the hand detection region 105. In this case, the avatar's corresponding virtual hand may be moved to a neutral position along that side of the avatar's body.

In implementations of this system that utilize "roaming", a control position is found relative to a neutral position. In these implementation, the avatar's feet may remain in fixed positions and the relative control position is used directly to determine the position of the avatar's torso over the fixed feet (the stance). FIG. 14 shows an avatar controlled in this manner. In implementations not using "roaming", the avatar's torso position may be determined directly by the position representing the center of the user's torso or alternatively a position relative to the top of the head, as found in optional component 609.

Additional details such the positions of secondary joints may be found through inverse kinematics techniques. In particular, the orientation data 613 associated with the forearm can be used to constrain the inverse kinematics solution to position the elbow to be near to the region from which the forearm originates within the hand detection region 105. The orientation data 613 constrains the elbow to a plane. The elbow's position on that plane is determined as the intersection of the arcs, with radii representing the length of the avatar's upper and lower arm segments, one centered on the avatar's hand position (in the virtual environment) and the other centered on a position relative to the avatar's torso representing the shoulder. Similarly the avatar's knee positions may be determined by the application program. By placing the avatar's feet in a fixed position and assuming the avatar's ankles cannot twist, the plane in which the knee bends is also fixed, and the knee position is determined by a similar intersection calculation as the elbows. Moreover, using the fixed foot position, the position of the avatar may be calculated such that the avatar appears to lean in a desired direction. With these calculations, the positions of the avatar's torso, hands, elbows, feet and knees are found, which is sufficient to animate the avatar.

$$X = \frac{Ix}{D} \qquad \text{Eq. 1}$$

where
I is the inter-camera distance
D is the disparity
x is the image position
X is the world coordinate position $$Y = \frac{(sFI\sin\alpha) + (Iy\cos\alpha)}{D} \qquad \text{Eq. 2}$$

where
I is the inter-camera distance
D is the disparity
F is the average focal length
s is a unit-conversion factor applied to the focal length
α is the angle of tilt between the cameras and the world coordinate z-axis
y is the image position
Y is the world coordinate position $$Z = \frac{(sFI\cos\alpha) + (Iy\sin\alpha)}{D} \qquad \text{Eq. 3}$$

where
I is the inter-camera distance
D is the disparity
F is the average focal length
s is a unit-conversion factor applied to the focal length
α is the angle of tilt between the cameras and the world coordinate z-axis
z is the image position
Z is the world coordinate position $$w = \begin{cases} \frac{(d + d_h - d_0)}{d_h} & \text{if } d > (d_0 - d_h) \\ 0 & \text{otherwise} \end{cases} \qquad \text{Eq. 4}$$

where
w is the weight, measured 0 to 1
d is the distance of the feature into the hand detection region
$d_0$ is the distance of the feature that is furthest into the hand detection region
$d_h$ is a predefined distance representing the expected size of the hand $$S = \begin{cases} S_A & \text{if } (D \leq D_A) \\ \alpha S_B + (1-\alpha) S_A \text{ where } \alpha = \frac{D - D_A}{D_B - D_A} & \text{if } (D_A < D < D_B) \\ S_B & \text{if } (D \geq D_B) \end{cases} \qquad \text{Eq. 5}$$

where $D = |r(t) - s(t-1)|$ s(t) is the smoothed value at time t
r(t) is the raw value at time t
$D_A$ and $D_B$ are thresholds
$S_A$ and $S_B$ define degrees of dampening $$a = \frac{e}{S} \qquad \text{Eq. 6}$$

where a is bound such that $0 \leq a \leq 1$
where
S is dampening found by Eq. 8
e is the elapsed time since the previous sample
a is a scalar $$s(t) = (a \times r(t)) + ((1-a) \times s(t-1)) \qquad \text{Eq. 7}$$

where
s(t) is the smoothed value at time t
r(t) is the raw value at time t
a is a scalar where $0 \leq a \leq 1$ $$x = \begin{cases} b_c + \beta(b_l - b_c) & \text{if } \text{left-arm} \\ b_c + \beta(b_r - b_c) & \text{if } \text{right-arm} \\ b_c & \text{if } \text{unknown} \end{cases} \qquad \text{Eq. 8}$$

where
x is the position of the hand detection region
$b_c$ is the position of the body's center
$b_l$ and $b_r$ are the positions of the left and right bounds of the body
β is a scalar representing the amount by which the hand detection region position is biased to the left or right side $$x_c = \begin{cases} 0 & \text{if } x_h < b_l \\ \frac{x_h - b_l}{b_r - b_l} & \text{if } b_l \leq x_h \leq b_r \\ 1 & \text{if } x_h > b_r \end{cases} \qquad \text{Eq. 9}$$

where
$x_h$ is the hand position in the world coordinate system
$x_c$ is the cursor position on the screen, mapped 0-1
$b_l$ and $b_r$ are the positions of the left and right bounds of a subregion within the hand detection region, w.r.t. the world coordinate system $$X_v = \begin{cases} -X_m & \text{if } x_h \leq b_l \\ -X_m \frac{x_h - \left(x_c - \frac{x_d}{2}\right)}{b_l - \left(x_c - \frac{x_d}{2}\right)} & \text{if } b_l < x_h < \left(x_c - \frac{x_d}{2}\right) \\ 0 & \text{if } \left(x_c - \frac{x_d}{2}\right) \leq x_h \leq \left(x_c + \frac{x_d}{2}\right) \\ X_m \frac{x_h - \left(x_c - \frac{x_d}{2}\right)}{b_l - \left(x_c - \frac{x_d}{2}\right)} & \text{if } \left(x_c + \frac{x_d}{2}\right) < x_h < b_r \\ X_m & \text{if } x_h \geq b_r \end{cases} \qquad \text{Eq. 10}$$

where
$X_v$ is the velocity applied in the virtual coordinate system
$X_m$ is the maximum magnitude of velocity that may be applied in the virtual coordinate system
$x_h$ is the position in the world coordinate system $x_c$ is the neutral position in the world coordinate system.
$x_d$ is the width of the "dead zone" in the world coordinate system
$b_l$ and $b_r$ are the positions of the left and right bounds of a sub-region w.r.t. the world coordinate system A number of implementations have been described. Nevertheless, it will be understood that various modifications may be made. Accordingly, other implementations are within the scope of the following claims.

What is claimed is:

1. A method comprising:
determining position information of a control object in an image;
mapping the position information of the control object to three-dimensional coordinates, wherein the three-dimensional coordinates comprise a depth coordinate;
determining that the three-dimensional coordinates of the control object are within three-dimensional bounds of a first virtual region if the depth coordinate of the control object indicates that the control object is located within a first depth range;
determining that the three-dimensional coordinates of the control object are within three-dimensional bounds of a second virtual region if the depth coordinate of the control object indicates that the control object is located within a second depth range, wherein a third virtual region is present between the first virtual region and the second virtual region; and
defining the three-dimensional coordinates of the control object as within the second virtual region if the depth coordinate of the control object indicates that the control object is located within the third virtual region immediately following the control object having been determined to be present within the second virtual region.

2. The method of claim 1, further comprising:
controlling an application based on the three-dimensional coordinates of the control object being determined to be within the three-dimensional bounds of the first virtual region.

3. The method of claim 1, further comprising:
controlling an application based on the three-dimensional coordinates of the control object being determined to be within the three-dimensional bounds of the second virtual region.

4. The method of claim 1, further comprising:
displaying, by the display, an avatar representing the control object.

5. The method of claim 4, wherein the avatar comprises a virtual human-like form.

6. The method of claim 1, wherein determining the position information of the control object in the image comprises:
identifying features in the image, wherein the image is of a scene;
determining a three-dimensional position for each feature of a plurality of features in the scene; and
analyzing the three-dimensional position of each feature of the plurality of features to determine position information of the control object.

7. The method of claim 6, further comprising:
identifying a position of a torso-divisioning plane based on the features in the scene; and
determining a position of a hand detection region relative to the torso-divisioning plane.

8. The method of claim 7, further comprising:
identifying a body center position and a body boundary position based on the features in the scene;
identifying an arm position indicating at least part of an arm based on the features in the scene; and
identifying the arm as either a left arm or a right arm based on the arm position indicating at least the part of the arm relative to the body center position.

9. The method of claim 1, further comprising:
calculating hand orientation information based on the three-dimensional coordinates of the control object.

10. The method of claim 1, further comprising:
selecting an object from a plurality of objects present in the image as the control object, wherein selection of the object is at least partially based on the object being within an object detection region and being closest to one or more cameras used to capture the image.

11. The method of claim 1, further comprising:
mapping the three-dimensional coordinates of the control object relative to a neutral control point position; and
transforming the mapped three-dimensional coordinates to a velocity function.

12. The method of claim 11, further comprising:
using the velocity function to move a viewpoint associated with the display.

13. The method of claim 1, further comprising:
creating a history of three-dimensional coordinates using position information of the control object, wherein:
the history is for a predefined duration of time, and
the history comprises three-dimensional coordinates associated with the control object from during the duration of time;
identifying a minimum position and maximum position in each dimension of the history;
determining a distance between the minimum position and the maximum position for each dimension of the history;
for each dimension, determining that the distance is within a predefined threshold distance; and
after determining that the distance is within the predefined threshold distance for each dimension, outputting an indication of a hover gesture.

14. A system comprising:
one or more processors; and
a memory communicatively coupled with and readable by the one or more processors and having stored therein processor-readable instructions which, when executed by the one or more processors, cause the one or more processors to:
determine position information of a control object in an image;
map the position information of the control object to three-dimensional coordinates, wherein the three-dimensional coordinates comprise a depth coordinate;
determine that the three-dimensional coordinates of the control object are within three-dimensional bounds of a first virtual region if the depth coordinate of the control object indicates that the control object is located at a first depth;
determine that the three-dimensional coordinates of the control object are within three-dimensional bounds of a second virtual region if the depth coordinate of the control object indicates that the control object is located at a second depth wherein a third virtual region is present between the first virtual region and the second virtual region; and
define the three-dimensional coordinates of the control object as within the second virtual region if the depth coordinate of the control object indicates that the control object is located within the third virtual region immediately following the control object having been determined to be present within the second virtual region.

15. The system of claim 14, wherein the processor-readable instructions, when executed by the one or more processors, further cause the one or more processors to:
control an application based on the three-dimensional coordinates of the control object being determined to be within the three-dimensional bounds of the first virtual region.

16. The system of claim 14, wherein the processor-readable instructions, which when executed by the one or more processors, further cause the one or more processors to:
control an application based on the three-dimensional coordinates of the control object being determined to be within the three-dimensional bounds of the second virtual region.

17. The system of claim 14, wherein the processor-readable instructions, which when executed by the one or more processors, further cause the one or more processors to:
cause an avatar representing the control object to be displayed.

18. The system of claim 17, wherein the avatar comprises a virtual human-like form.

19. The system of claim 14, wherein the processor-readable instructions that cause the one or more processors to determine the position information of the control object in the image further comprise processor-readable instructions, which when executed by the one or more processors, cause the one or more processors to:
identify features in the image, wherein the image is of a scene;
determine a three-dimensional position for each feature of a plurality of features in the scene; and
analyze the three-dimensional position of each feature of the plurality of features to determine position information of the control object.

20. The system of claim 19, wherein the processor-readable instructions, when executed by the one or more processors, further cause the one or more processors to:
identify a position of a torso-divisioning plane based on the features in the scene; and
determine a position of a hand detection region relative to the torso-divisioning plane.

21. The system of claim 20, wherein the processor-readable instructions, when executed by the one or more processors, further cause the one or more processors to:
identify a body center position and a body boundary position based on the features in the scene;
identify an arm position indicating at least part of an arm based on the features in the scene; and
identify the arm as either a left arm or a right arm based on the arm position indicating at least the part of the arm relative to the body center position.

22. The system of claim 14, wherein the processor-readable instructions, when executed by the one or more processors, further cause the one or more processors to:
calculate hand orientation information based on the three-dimensional coordinates of the control object.

23. The system of claim 14, wherein the processor-readable instructions, when executed by the one or more processors, further cause the one or more processors to:
select an object from a plurality of objects present in the image as the control object, wherein selection of the object is at least partially based on the object being within an object detection region and being closest to one or more cameras used to capture the image.

24. The system of claim 14, wherein the processor-readable instructions, when executed by the one or more processors, further cause the one or more processors to:
map the three-dimensional coordinates of the control object relative to a neutral control point position; and
transform the mapped three-dimensional coordinates to a velocity function.

25. The system of claim 24, wherein the processor-readable instructions, when executed by the one or more processors, further cause the one or more processors to:
use the velocity function to move a viewpoint associated with the display.

26. The system of claim 14, wherein the processor-readable instructions, when executed by the one or more processors, further cause the one or more processors to:
create a history of three-dimensional coordinates using position information of the control object, wherein:
the history is for a predefined duration of time, and
the history comprises three-dimensional coordinates associated with the control object from during the duration of time;
identify a minimum position and maximum position in each dimension of the history;
determine a distance between the minimum position and the maximum position for each dimension of the history;
for each dimension, determine that the distance is within a predefined threshold distance; and
after determining that the distance is within the predefined threshold distance for each dimension, output an indication of a hover gesture.

27. A non-transitory processor-readable storage medium, the medium comprising processor-readable instructions configured to cause a processing system to:
determine position information of a control object in an image;
map the position information of the control object to three-dimensional coordinates, wherein the three-dimensional coordinates comprise a depth coordinate;
determine that the three-dimensional coordinates of the control object are within three-dimensional bounds of a first virtual region if the depth coordinate of the control object indicates that the control object is located at a first depth;
determine that the three-dimensional coordinates of the control object are within three-dimensional bounds of a second virtual region if the depth coordinate of the control object indicates that the control object is located at a second depth, wherein a third virtual region is present between the first virtual region and the second virtual region; and
define the three-dimensional coordinates of the control object as within the second virtual region if the depth coordinate of the control object indicates that the control object is located within the third virtual region immediately following the control object having been determined to be present within the second virtual region.

28. The medium of claim 27, wherein the processor-readable instructions are further configured to cause a processing system to:
control an application based on the three-dimensional coordinates of the control object being determined to be within the three-dimensional bounds of the first virtual region.

29. An apparatus comprising:
- means for determining position information of a control object in an image;
- means for mapping the position information of the control object to three-dimensional coordinates, wherein the three-dimensional coordinates comprise a depth coordinate;
- means for determining that the three-dimensional coordinates of the control object are within three-dimensional bounds of a first virtual region if the depth coordinate of the control object indicates that the control object is located at a first depth;
- means for determining that the three-dimensional coordinates of the control object are within three-dimensional bounds of a second virtual region if the depth coordinate of the control object indicates that the control object is located at a second depth, wherein a third virtual region is present between the first virtual region and the second virtual region; and
- means for defining the three-dimensional coordinates of the control object as within the second virtual region if the depth coordinate of the control object indicates that the control object is located within the third virtual region immediately following the control object having been determined to be present within the second virtual region.

30. The apparatus of claim 29, further comprising:
- means for controlling an application based on the three-dimensional coordinates of the control object being determined to be within the three-dimensional bounds of the first virtual region.

\* \* \* \* \*